(12) United States Patent
Minato

(10) Patent No.: US 8,306,426 B2
(45) Date of Patent: Nov. 6, 2012

(54) OPTICAL CODE DIVISION MULTIPLEXING COMMUNICATION SYSTEM AND METHOD FOR CORRECTING FAILURE OF THE SAME

(75) Inventor: Naoki Minato, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 384 days.

(21) Appl. No.: 12/801,200

(22) Filed: May 27, 2010

(65) Prior Publication Data

US 2011/0076008 A1    Mar. 31, 2011

(30) Foreign Application Priority Data

Sep. 30, 2009   (JP) ................................ 2009-226742

(51) Int. Cl.
*H04B 10/08*   (2006.01)
*H04J 14/00*   (2006.01)
*H04J 14/02*   (2006.01)

(52) U.S. Cl. ................ 398/93; 398/33; 398/38; 398/77; 398/87; 398/149

(58) Field of Classification Search .................... 398/33, 398/38, 77, 82, 84, 87, 93, 149
See application file for complete search history.

(56) References Cited

U.S. PATENT DOCUMENTS 7,251,397 B2 *   7/2007   Adachi et al. .................... 385/37
2011/0097079 A1 *   4/2011   Hanawa .......................... 398/25

OTHER PUBLICATIONS

G. Cincotti, et al., "Characterization of Full Encoder/Decoder in the AWG Configuration for Code-Based Photonic Routers—Part 1: Modeling and Design," Journal of Lightwave Technology Vo. 24, No. 1, pp. 103-112, Jan. 2006.
Kobayashi, et al., Experimental Study on Code Reconfigurability in FBG Based Encoder/Decoder, IEICE Tech. Rep., OPE2008-86, pp. 127-132, Aug. 2008.
G. Cincotti, et al., "Full Optical Encoders/Decoders for Photonic IP Routers," Journal of Lightwave Technology Vo. 22, No. 2, pp. 337-342, Feb. 2004.

* cited by examiner

*Primary Examiner* — Dalzid Singh
(74) *Attorney, Agent, or Firm* — Rabin & Berdo, P.C.

(57) ABSTRACT

An OCDM communication system and a method for correcting failure of the same are provided. In the system, encoders and decoders are provided respectively for channels. Each encoder, including an SSFBG, encodes an optical signal using a code value determined according to distance between adjacent unit fiber Bragg gratings in the SFFBG. Each decoder, including an SFFBG, generates a received optical signal by decoding the encoded signal using a code value determined in the same manner. A set temperature of each encoder and decoder is calculated and a corresponding control signal is generated based on average power and error rate detection signals of each received optical signal. The temperature of each encoder or decoder is individually adjusted according to the control signal, which makes equal the code values of an encoder and decoder of a channel in which average power of a received signal has changed or error rate thereof is excessive.

19 Claims, 15 Drawing Sheets

US 8,306,426 B2

OPTICAL CODE DIVISION MULTIPLEXING COMMUNICATION SYSTEM AND METHOD FOR CORRECTING FAILURE OF THE SAME

BACKGROUND OF THE INVENTION

1. Field of the Invention

The present invention relates to an Optical Code Division Multiplexing (OCDM) communication system, and more particularly to a method for detecting and correcting a failure that occurs when transmission information is encoded and decoded and an OCDM communication system having functions to implement the method.

2. Description of the Related Art

Recently, demand for communication has rapidly increased along with spread of the Internet or the like and a network having large capacity and high speed using optical fibers has been implemented to meet such demand. An optical multiplexing technology which collectively transmits optical pulse signals of multiple channels through one optical fiber has been regarded as important to increase communication capacity.

Optical Code Division Multiplexing (OCDM) is under study as an optical multiplexing technology. OCDM can save communication resources since one channel does not occupy physical resources such as a time slot or wavelength. OCDM can also achieve high speed processing since a passive element can be used as a means for encoding and decoding transmission information and thus a series of processes from encoding to decoding can be performed using optical signals without conversion. In addition, OCDM does not require synchronization between channels and thus can simplify system configuration.

In a communication system using the OCDM scheme, some devices use, for example, a Waveguide-Grating-Router (WGR) described in Non-Patent Reference 1, which is described later, or a Superstructured Fiber Bragg Grating (SSFBG) described in Non-Patent Reference 2, which is described later, as a passive element for encoding and decoding transmission information.

The principle of OCDM described in Non-Patent Reference 2 is described as follows. FIG. 1 illustrates details of a process for encoding an input signal using an SSFBG, which is a passive element, as an encoding means. When a pulsed input signal 11 is input, the input signal 11 is input to an SSFBG 13 through a circulator 12. The SSFBG 13 includes N unit gratings $13_1, 13_2, \ldots, 13_N$ connected in cascade. Each of the unit gratings partially transmits and partially reflects light having the same wavelength as the Bragg reflection wavelength. Since the unit gratings are present in the SSFBG 13 at different positions, the input signal 11 is reflected and re-coupled at the N positions in the SSFBG 13 in the case where all unit gratings $13_1$ and $13_N$ have the same Bragg reflection wavelength and the wavelength of the input signal 11 is equal to the Bragg reflection wavelength of the unit gratings. Here, let $14_i$ be light reflected at a specific unit grating $13_i$, where i is one of 1 to N. This reflected light $14_i$ is referred to as a "chip pulse". N corresponding to the number of unit gratings in the SSFBG 13 is referred to as the "number of chips" or "chip count". Chip pulses are output through the circulator 12, thereby obtaining an output signal 15 including the N chip pulses.

Let $L_j$ be the distance between adjacent unit gratings $13_j$ and $13_{j+1}$, where j is one of 1 to N−1. Here, since a time interval $Tc_j$ between the chip pulses $14_j$ and $14_{j+1}$ is equal to a round-trip propagation time between adjacent unit gratings $13_j$ and $13_{j+1}$, the time interval $Tc_j$ is expressed as follows.

$$Tc_j = \frac{2n_{eff}L_j}{c} \quad (1)$$

Here, c is the speed of light in a vacuum, and $n_{eff}$ is an effective index of refraction of the SSFBG.

A phase difference $\theta_j$ between the chip pulses $14_j$ and $14_{j+1}$ is expressed as follows.

$$\theta_j = \frac{4\pi n_{eff} L_j}{\lambda_0} + 2\pi n \quad (2)$$

Here, $\lambda_0$ is the optical wavelength of the signal (i.e., the Bragg reflection wavelength of the unit grating) and n is an arbitrary integer. This phase difference $\theta_j$ is an encoding pattern used for encoding the input signal.

Signals multiplexed through encoding and decoding processes can be identified using both the process for dividing one pulse into a plurality of chip pulses as described above and phase difference information between the chip pulses. This encoding scheme is referred to as a "time spreading scheme" since one pulse is divided into a plurality of pulses and the pulses are arranged on the time axis. This encoding scheme is also referred to as a "coherent time spreading scheme" since the encoding scheme uses phase information.

The operating principle of OCDM using coherent time spreading encoding is described as follows with reference to FIGS. 2A to 2D. FIG. 2A is a block diagram illustrating a schematic configuration of a communication system that performs communication using the OCDM scheme, FIG. 2B illustrates a waveform of the intensity of an optical output signal S1 transmitted by a transmitter 21, FIG. 2C illustrates a waveform of the intensity of an encoded signal S2 transmitted by an encoder 22, and FIG. 2D illustrates a waveform of the intensity of a decoded signal S3 transmitted by a decoder 23.

The transmitter 21 is a means for transmitting digital information and transmits 1-bit information at regular intervals. The 1-bit information transmitted by the transmitter 21 is represented by one optical pulse. For example, data "1" is represented by presence of an optical pulse and data "0" is represented by absence of an optical pulse. The optical output signal S1 from the transmitter 21 is provided to the encoder 22.

The encoder 22 includes an SSFBG having a plurality of unit gratings. The encoder 22 encodes the optical output signal S1 provided from the transmitter 21 according to a code value which is based on the structure of the SSFBG and outputs an encoded signal S2 including a number of chip pulses corresponding to the number of chips in the SSFBG, and then provides the encoded signal S2 to the decoder 23.

The decoder 23 includes an SSFBG having the same structure as that of the encoder 22. The decoder 23 again divides each of the chip pulses generated by the encoder 22 into a number of pulses corresponding to the number of chips of the SSFBG of the decoder 23. Each of the chip pulses generated through division at the decoder 23 is referred to as a "divided chip pulse". That is, the decoder 23 generates a number of divided chip pulses corresponding to the product of the number of chips of the encoder 22 and the number of chips of the decoder 23. Each of the divided chip pulses has a phase corresponding to the code value of the decoder 23. The decoder 23 adds the divided chip pulses having different phases taking into consideration the time intervals and phases of the divided chip pulses and outputs and provides the resulting signal as a decoded signal S3 to the receiver 24. Here, the peak intensity of the decoded signal S3 is high when the encoder 22 and the decoder 23 have the same code value. On the other hand, the peak intensity of the decoded signal S3 is low when the encoder 22 and the decoder 23 have different code values. The receiver 24 receives the decoded signal S3 provided by the decoder 23 and reproduces digital information transmitted by the transmitter 21. The receiver 24 can reproduce the digital information only when the decoded signal S3 provided from the decoder 23 has a high peak intensity, i.e., only when the code values of the encoder 22 and the decoder 23 are equal. OCDM accomplishes multiplexed transmission of optical signals by allocating a different code value to each channel.

If code values are created according to the above Equations (1) and (2), phase differences $\theta_j$ between chip pulses are different and therefore distances between unit gratings $L_j$ are also different and thus time intervals $Tc_j$ between adjacent chip pulses are also different. However, when mathematical models are created assuming that all time intervals $Tc_j$ are equal, this assumption has almost no influence upon OCDM operation for the reason described below. Therefore, in the following description, it is assumed that all time intervals between adjacent pulses are equal to "Tc" for the sake of ease of explanation.

Changing of the phase difference $\theta_j$ between adjacent chip pulses from 0 to $2\pi$ is sufficient for encoding. $L_j$ required to change $\theta_j$ by $2\pi$ according to Equation (2) is on the order of the signal wavelength since the effective index of refraction $n_{eff}$ of the SSFBG is generally about 1.5. A corresponding time interval is on the order of the reciprocal of the optical frequency of the signal. Generally, the time width of light generated from a pulse light source is sufficiently larger than the reciprocal of the optical frequency. Therefore, even though time intervals between adjacent chip pulses are fixed to the specific value Tc, errors of the time intervals are sufficiently smaller than the chip pulse width and therefore it can be assumed that there is very little change in overlapping between the chip pulses generated through division in the decoding operation described above.

The operation of the encoder 22 is similar to that described above with reference to FIG. 1. Phase differences between adjacent ones of the chip pulses generated by the encoder 22 are denoted by $\theta_{e1}, \theta_{e2}, \ldots \theta_{eN-1}$ in the order of time. When the electric field time waveform of the input pulse is represented by p(t) (t: time), an electric field time waveform E(t) of the encoded light is obtained as follows.

$$E(t) = \frac{1}{\sqrt{N}} p(t) + \frac{1}{\sqrt{N}} p(t - Tc) \exp[i\theta_{e1}] + \frac{1}{\sqrt{N}} p(t - 2Tc) \exp[i\theta_{e1}] \exp[i\theta_{e2}] + \ldots + \frac{1}{\sqrt{N}} p(t - (N-1)Tc) \exp[i\theta_{e1}] \exp[i\theta_{e2}] \ldots \exp[i\theta_{eN-1}] = \frac{1}{\sqrt{N}} \left\{ p(t) + \sum_{j=1}^{N-1} p(t - jTc) \exp\left[i \sum_{k=1}^{j} \theta_{e_k}\right] \right\} \quad (3)$$

Here, it is assumed that the magnitudes of the amplitudes of all chip pulses are equal and the magnitudes thereof are expressed in an arbitrary scale. In Equation (3), "i" represents the imaginary unit.

When the receiver 24 receives one chip pulse generated by the encoder 22, the receiver 24 divides the chip pulse into chip pulses as described above. Phase differences between adjacent ones of the divided chip pulses are represented by $\theta_{d1}, \theta_{d2}, \ldots \theta_{dN-1}$. Here, the electric field time waveform D(t) of the decoded light is expressed as follows.

$$D(t) = \frac{1}{\sqrt{N}} E(t) + \frac{1}{\sqrt{N}} E(t - Tc) \exp[i\theta_{d1}] + \frac{1}{\sqrt{N}} p(t - 2Tc) \exp[i\theta_{d1}] \exp[i\theta_{d2}] + \ldots + \frac{1}{\sqrt{N}} E(t(N-1)Tc) \exp[i\theta_{d1}] \exp[i\theta_{d2}] \ldots \exp[i\theta_{dN-1}] = \frac{1}{\sqrt{N}} \left\{ E(t) + \sum_{j=1}^{N-1} p(t - jTc) \exp\left[i \sum_{k=1}^{j} \theta_{d_k}\right] \right\} \quad (4)$$

Here, it is assumed that the magnitudes of the amplitudes of all divided chip pulses are equal and the magnitudes thereof are expressed in an arbitrary scale. From Equation (4), it can be understood that the time waveform of the decoded optical signal has the following structure. That is, the time waveform of the decoded optical signal includes one divided chip pulse at the beginning of the time waveform as shown in FIG. 2D. When $I_1$ is an integer which is equal to or greater than 1 and equal to or less than N−1, a pulse generated through superposition of $I_3+1$ divided chip pulses having different phases appears after a time of $I_1 \times Tc$ from the beginning divided chip pulse. When $I_2$ is an integer which is equal to or greater than N and equal to or less than 2N−3, a pulse generated through superposition of $2N-I_2-1$ divided chip pulses having different phases appears after $I_2 \times Tc$ from the beginning divided chip pulse. One pulse appears after $2(N-1) \times Tc$ from the beginning divided chip pulse. Here, taking into consideration the signal intensity after $(N-1) \times Tc$ from the beginning divided chip pulse, at the moment when N−1 conditions expressed by Equation (5) are satisfied simultaneously, the phases of the N divided chip pulses are all equal according to Equations (3) and (4) and the intensity of the resulting pulse is $N^2$ times as high as the intensity of one divided chip pulse.

$$\theta_{ej} = 0 \theta_{dN-j} (j=1,2, \ldots N-1)| \quad (5)$$

At other times, N−1 divided chip pulses exhibit maximal overlap. When the conditions of Equation 5 are not satisfied, a pulse whose intensity is $N^2$ times as high as the intensity of one divided chip pulse cannot be obtained at any time. Accordingly, the intensity is the peak intensity from among intensities obtained through encoding using all combinations of code values. Therefore, when code values satisfying the conditions of Equation (5) are assigned to the encoder and the decoder, it is assumed that the code values are equal and other combinations of code values are different.

An encoding scheme that identifies a received optical signal obtained by assigning different code values to the transmitter and the receiver and a received optical signal obtained by assigning the same code value to the transmitter and the receiver while satisfying the conditions of Equation 5 has been suggested in Non-Patent Reference 3 described later. In the encoding scheme described in Non-Patent Reference 3, phase differences between adjacent chip pulses are all equal and the phase difference is used as a code value. This encoding scheme is employed in encoding and decoding devices described in Non-Patent References 1 and 2.

In the case where all phase differences between adjacent chip pulses are equal to $\theta_e$ when encoding is performed and all phase differences between adjacent divided chip pulses are equal to $\theta_d$ when decoding is performed, an electric field time waveform E'(t) of encoded light is expressed as follows according to the definition of the code value and Equation (6).

$$E'(t) = \frac{1}{\sqrt{N}} \left\{ p(t) + \sum_{j=1}^{N-1} p(t - jTc) \exp[ij\theta e] \right\} \quad (6)$$

An electric field time waveform D'(t) of decoded light is expressed as follows according to the definition of the code value and Equation (7).

$$D'(t) = \frac{1}{\sqrt{N}} \left\{ E'(t) + \sum_{j=1}^{N-1} E'(t - jTc) \exp[ij\theta d] \right\} \quad (7)$$

Non-Patent Reference 1: G. Cincotti, et al., "Characterization of Full Encoder/Decoder in the AWG Configuration for Code-Based Photonic Routers—Part I: Modeling and Design," Journal of Lightwave Technology Vo. 24, No. 1, pp. 103-112, January 2006

Non-Patent Reference 2: Kobayashi, et al., "Experimental Study on Code Reconfigurability in FBG Based Encoder/Decoder", IEICE Tech. Rep., OPE2008-86, pp. 127-132, August 2008.

Non-Patent Reference 3: G. Cincotti, et al., "Full Optical Encoders/Decoders for Photonic IP Routers," Journal of Lightwave Technology Vo. 22, No. 2, pp. 337-342, February 2004

In the OCDM communication system including the encoder and the decoder, there is a need to maintain the code value set in the encoder and the decoder during communication. That is, in the case where the phase difference between adjacent chip pulses is used as the code value, the receiver may fail to reproduce original digital information when the phase difference has changed. The code value set in the encoder and the decoder changes when the optical path length of each optical waveguide included in the encoder and the decoder changes. This optical path length changes depending on stress such as tension applied to the optical waveguide or change of temperature of the optical waveguide. Therefore, during communication, there is a need to perform control for keeping the optical path length constant so as to prevent change in the code value set in the encoder and the decoder.

In OCDM communication, optical signals of multiple channels are multiplexed and transmitted in one optical fiber transmission path and the multiplexed optical signals are collectively received by the receiving side. In the case where a code value set in an encoder or decoder of one of the channels has changed, there is a need to specify (or identify) the channel of the encoder or decoder whose code value has changed by monitoring the optical signals received by the receiving side. In addition, there is a need to control the code value of the encoder or decoder of the specified channel so as to reach the original code value while minimizing influence exerted upon communication states of the other channels.

SUMMARY OF THE INVENTION

Therefore, the present invention has been made in view of the above problems, and it is an object of the present invention to provide a method for specifying a channel in which a code value has changed, specifying whether the changed code value is that of an encoder or a decoder of the channel, and returning the changed code value to a normal value, and an Optical Code Division Multiplexing (OCDM) communication system having a function to implement the method.

In accordance with an aspect of the present invention, the above and other objects can be accomplished by the provision of an Optical Code Division Multiplexing (OCDM) communication system including a plurality of encoders provided respectively for a plurality of communication channels, each of the encoders including a superstructured fiber Bragg grating, in which a plurality of unit fiber Bragg gratings is arranged, and encoding an optical signal using a code value determined according to a distance between adjacent ones of the unit fiber Bragg gratings, a plurality of decoders provided respectively for the plurality of communication channels, each of the decoders including a superstructured fiber Bragg grating, in which a plurality of unit fiber Bragg gratings is arranged, and generating a received optical signal by decoding an optical signal encoded by a corresponding encoder using a code value determined according to a distance between adjacent ones of the unit fiber Bragg gratings, a temperature changing part that individually changes a temperature of each of the encoders and the decoders based on a control signal, a transmission path provided for multiplexed transmission of optical signals between the encoders and the decoders, a power monitoring part that generates a first detection signal indicating whether or not an average power of each received optical signal has changed in each unit time, an error monitoring part that generates a second detection signal according to an error rate of each received optical signal, and a set temperature calculating part that calculates a set temperature of the encoder or decoder based on the first and second detection signals and provides the calculated set temperature as the control signal to the temperature changing part, wherein the set temperature calculating part calculates the set temperature of the encoder or the decoder so that respective code values of an encoder and a decoder belonging to a communication channel in which an average power of a received optical signal has changed or a communication channel in which an error rate of a received optical signal is higher than a predetermined value are equal.

In accordance with another aspect of the present invention, there is provided a method for correcting failure of an Optical Code Division Multiplexing (OCDM) communication system including a plurality of encoders provided respectively for a plurality of communication channels, each of the encoders including a superstructured fiber Bragg grating, in which a plurality of unit fiber Bragg gratings is arranged, and encoding an optical signal using a code value determined according to a distance between adjacent ones of the unit fiber Bragg gratings, a plurality of decoders provided respectively for the plurality of communication channels, each of the decoders including a superstructured fiber Bragg grating, in which a plurality of unit fiber Bragg gratings is arranged, and generating a received optical signal by decoding an optical signal encoded by a corresponding encoder using a code value determined according to a distance between adjacent ones of the unit fiber Bragg gratings, and a transmission path provided for multiplexed transmission of optical signals between the encoders and the decoders, the method including a first detection process including detecting whether or not an average power of each received optical signal has changed in each unit time, a second detection process including detecting whether or not an error rate of each received optical signal is higher than a predetermined value, and a temperature control process including controlling the temperature of the encoder or the decoder so that respective code values of an encoder and a decoder belonging to a communication channel in which an average power of a received optical signal has changed or a communication channel in which an error rate of a received optical signal is higher than a predetermined value are equal.

According to the Optical Code Division Multiplexing (OCDM) communication system and the method for correcting failure of the OCDM communication system according to the present invention, it is possible to specify a channel in which a failure has occurred and also to specify whether a failure has occurred in an encoder or a decoder of the channel. In addition, code values of an encoder and a decoder of a channel in which a failure has occurred are corrected so that the code values of the encoder and the decoder are equal by performing temperature control of the encoder while monitoring average powers of received optical signals of all channels at the encoder and by performing temperature control of the decoder while monitoring an error rate of received information of the channel at the decoder. Therefore, it is possible to restore communication of the channel without affecting communication of other channels.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
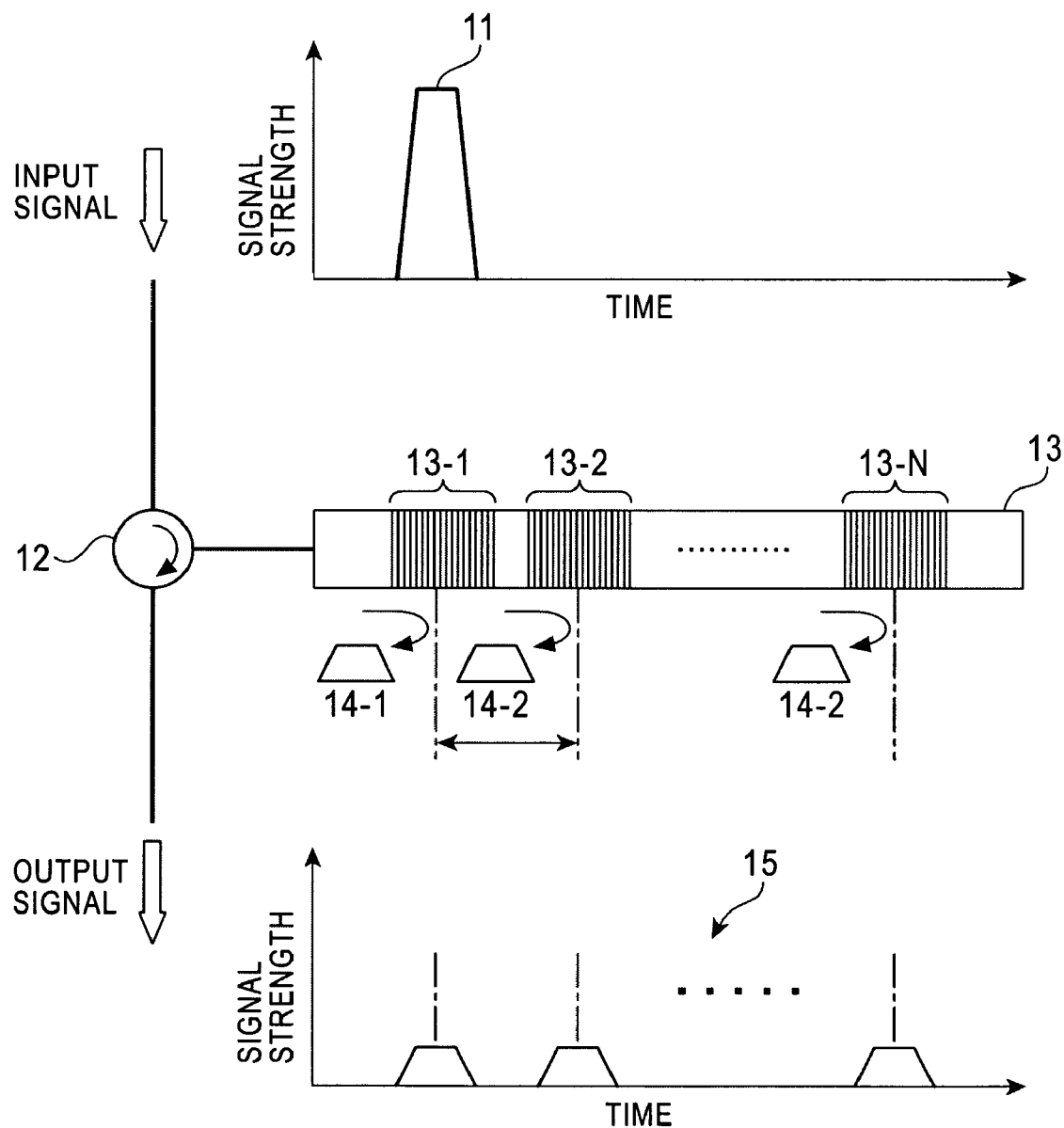
FIG. 1 illustrates details of a process for encoding an input signal using an SSFBG.
Figure 2A:
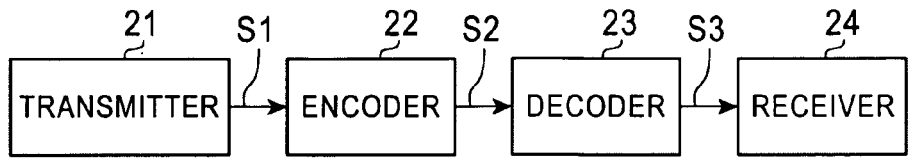
FIG. 2A is a block diagram illustrating a schematic configuration of a communication system that performs communication using the OCDM scheme.
Figure 2B:
FIG. 2B illustrates a waveform of the intensity of an optical output signal S1 transmitted by a transmitter 21.
Figure 2C:
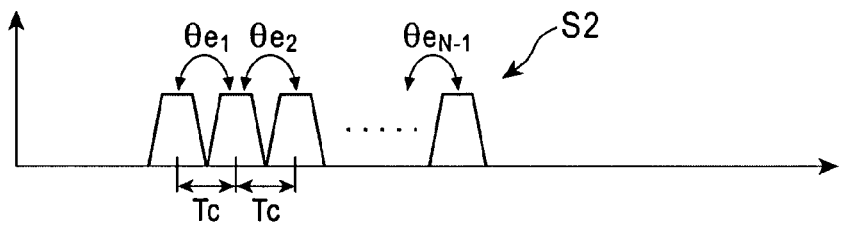
FIG. 2C illustrates a waveform of the intensity of an encoded signal S2 transmitted by an encoder 22.
Figure 2D:
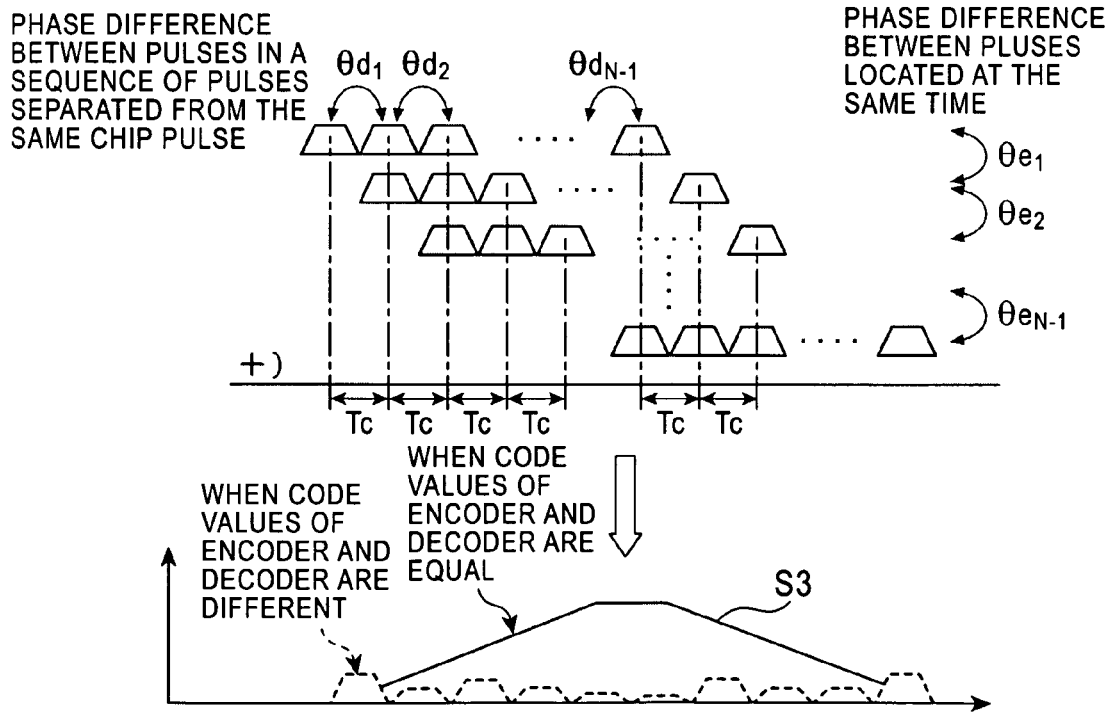
FIG. 2D illustrates a waveform of the intensity of a decoded signal S3 transmitted by a decoder 23.

Embodiments of the present invention will now be described with reference to the drawings. In the drawings described below, substantially the same or equivalent elements or portions are denoted by the same reference numerals.

Figure 3:
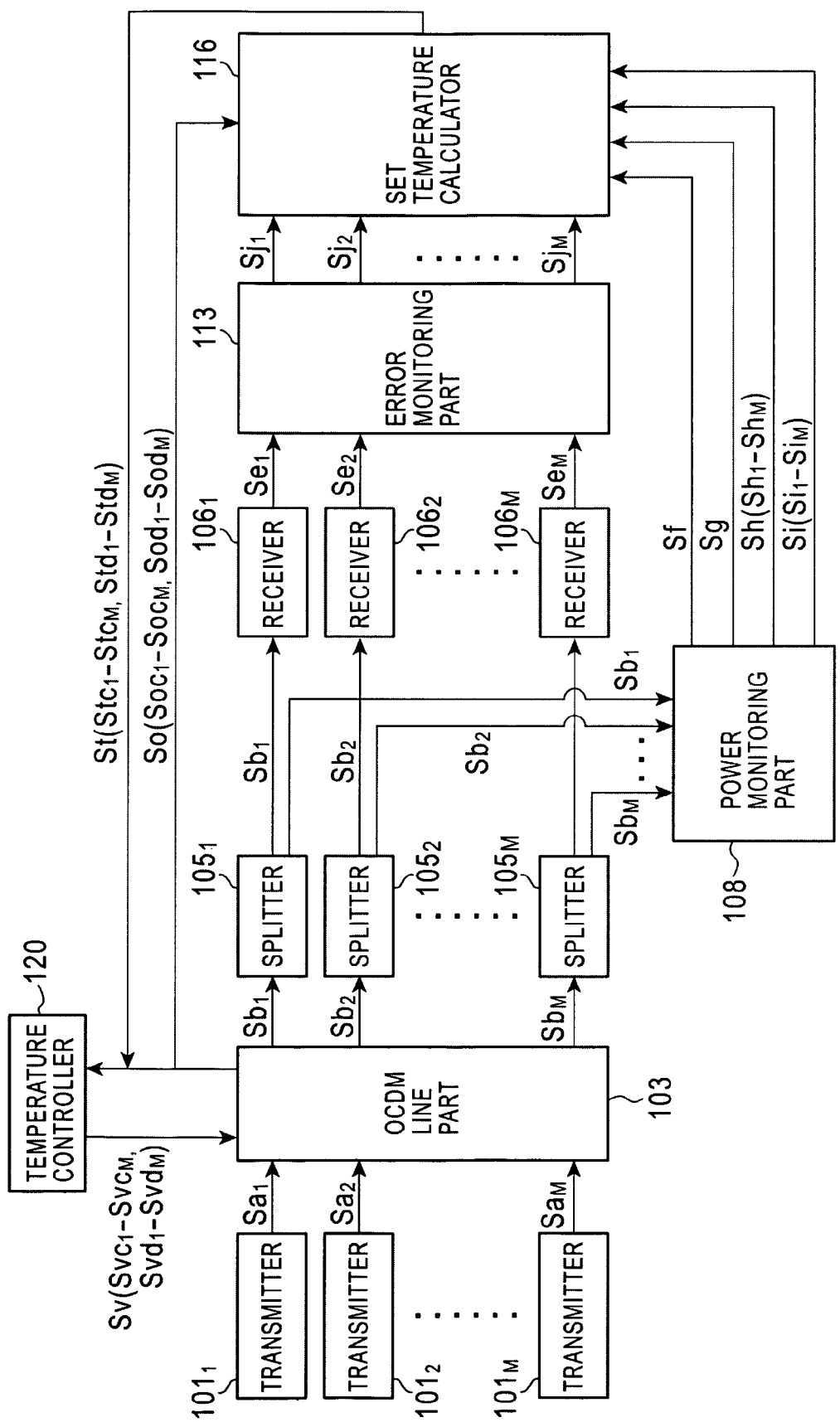
FIG. 3 is a block diagram illustrating an entire configuration of an Optical Code Division Multiplexing (OCDM) communication system according to an embodiment of the present invention.

FIG. 3 is a block diagram illustrating an entire configuration of an Optical Code Division Multiplexing (OCDM) communication system according to an embodiment of the present invention. Each transmitter $101_k$ converts transmission information of a channel k into an optical signal to output a transmission optical signal $Sa_k$ and provides the transmission optical signal $Sa_k$ to an OCDM line part 103. Here, "k" is a channel number which has a value of 1 to M, where "M" is the number of multiplexed channels.

The OCDM line part 103 includes multiplexing lines and encodes transmission optical signals $Sa_k$ transmitted by the transmitters $101_k$ using respective code value assigned to the multiple channels. The OCDM line part 103 then multiplexes and transmits the encoded signals to the receiving side in the OCDM line part 103 and then decodes and provides the signals as received optical signals $Sb_k$ to splitters $105_k$. As described later, the OCDM line part 103 includes an encoder $301_k$ and a decoder $307_k$ for each channel. The encoders $301_k$ and the decoders $307_k$ include temperature changing elements $302_k$ and $308_k$ for changing their own temperatures, respectively. Each of the temperature changing elements $302_k$ and $308_k$ changes its own temperature based on a corresponding temperature control signal $Svc_k$ or $Svd_k$ provided from the temperature controller 120 and heats or cools the corresponding encoder $301_k$ or $307_k$. That is, the OCDM line part 103 controls the temperature of an encoder of each channel based on a corresponding temperature control signal $Svc_k$ and controls the temperature of a decoder of each channel based on a corresponding temperature control signal $Svd_k$, thereby controlling code values assigned respectively to each encoder and each decoder. The OCDM line part 103 outputs measured respective temperatures of each encoder $301_k$ and each decoder $307_k$ as temperature information signals $Soc_k$ and $Sod_k$ and provides the temperature information signals $Soc_k$ and $Sod_k$ to the set temperature calculator 116 and the temperature controller 120. In FIG. 3, temperature control signals $Svc_1$ to $Svc_M$ and $Svd_1$ to $Svd_M$ corresponding to all channels are collectively shown by one line and denoted by a reference symbol "Sv" for ease of illustration. Similarly, temperature information signals $Soc_1$ to $Soc_M$ and $Sod_1$ to $Sod_M$ corresponding to all channels are collectively shown by one line and denoted by a reference symbol "So".

Each splitter $105_k$ separates a received optical signal $Sb_k$ from the OCDM line part 103 into two signals and provides one of the signals to a corresponding receiver 106 and the other to a power monitoring part 108.

The receiver $106_k$ converts the received optical signal $Sb_k$ provided from the splitter $105_k$ into an electrical signal to restore received information and calculates an error rate of the received information to obtain a corresponding error value and outputs the error rate value as an error information signal $Se_k$ of a corresponding channel.

The power monitoring part 108 calculates respective average powers of the received optical signals $Sb_1$ to $Sb_M$ of all channels provided from the splitters $105_1$ to $105_M$. The power monitoring part 108 outputs a power increase detection signal Sf indicating whether or not any received optical signal, the power of which has increased with time, is present in the received optical signals of all channels and outputs a power decrease detection signal Sg indicating whether or not any received optical signal, the power of which has decreased with time, is present in the received optical signals of all channels. In addition, the power monitoring part 108 outputs respective individual channel power increase detection signals $Sh_k$ of all channels, each indicating whether or not the power of a received optical signal $Sb_k$ of the corresponding channel k has increased with time. The power monitoring part 108 also outputs respective individual channel power decrease detection signals $Si_k$ of all channels, each indicating whether or not the power of a received optical signal $Sb_k$ of the corresponding channel k has decreased with time. In FIG. 3, the individual channel power increase detection signals $Sh_1$ to $Sh_M$ corresponding to all channels are collectively shown by one line and denoted by a reference symbol "Sh" for ease of illustration. Similarly, the individual channel power decrease detection signals $Si_1$ to $Si_M$ corresponding to all channels are collectively shown by one line and denoted by a reference symbol "Si".

An error monitoring part 113 outputs respective error detection signals $Sj_1$ to $Sj_M$ of all channels, each indicating whether or not an error rate of received information of a corresponding channel indicated by a corresponding one of the error information signals $Se_1$ to $Se_M$ provided from the outputs of the receivers $106_1$ to $106_M$ is greater than a predetermined Value, and provides the error detection signals $Sj_1$ to $Sj_M$ to the set temperature calculator 116.

The set temperature calculator 116 calculates respective set temperature values of the encoders and the decoders in the OCDM line part 103 based on signals Sf, Sg, Sh, and Si associated with increases and decreases in the powers of the received optical signals provided from the power monitoring part 108, the error detection signals $Sj_1$ to $Sj_M$ provided from the error monitoring part 113, and the temperature information signals So provided from the OCDM line part 103 and outputs the calculated values as temperature setting signals $Stc_k$ and $Std_k$ and provides the temperature setting signals $Stc_k$ and $Std_k$ to the temperature controller 120. In FIG. 3, the temperature setting signals $Stc_1$ to $Stc_M$ and $Std_1$ to $Std_M$ corresponding to all channels are collectively shown by one line and denoted by a reference symbol "St" for ease of illustration.

The temperature controller 120 is a means for controlling respective temperatures of the encoders and the decoders in the OCDM line part 103 to reach the set temperatures calculated by the set temperature calculator 116. That is, as will be described in more detail with reference to FIG. 5, the temperature controller 120 outputs a temperature control signal $Svc_k$ for controlling the operation of the temperature changing element $302_k$ provided in association with each encoder $301_k$, based on each temperature setting signal $Stc_k$ provided from the set temperature calculator 116, and outputs a temperature Control signal $Svd_k$ for controlling the operation of the temperature changing element $308_k$ provided in association with each decoder $307_k$, based on each temperature setting signal $Std_k$ provided from the set temperature calculator 116, and provides the temperature control signals $Svc_k$ and $Svd_k$ to the temperature changing elements $302_k$ and $308_k$ in the OCDM line part 103.

For example, one product (Model Name: LDC3900) of ILX Lightwave Corporation may be used for the temperature controller 120. The temperature control signals $Svc_k$ and $Svd_k$ and the temperature information signal $Soc_k$ and $Sod_k$ may be transmitted from the receiving side to the transmitting side. In this case, the temperature control signals $Svc_k$ and $Svd_k$ and the temperature information signal $Soc_k$ and $Sod_k$ may be transmitted through lines (for example, separate fibers, WDM channels, or the like) separated from those of information signals. Here, it is assumed that failure such as reduction to zero or change in the power of a received optical signal due to fiber disconnection, malfunction of a device at the transmitting side, or the like is eliminated using a separate means.

Figure 4A:
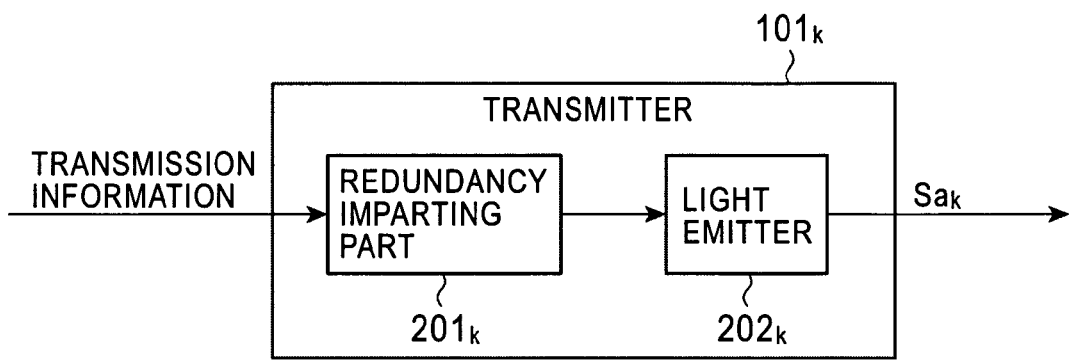
FIG. 4A is a block diagram illustrating a configuration of a transmitter according to an embodiment of the present invention and FIG. 4B is a block diagram illustrating a configuration of a receiver according to an embodiment of the present invention.
Figure 4B:
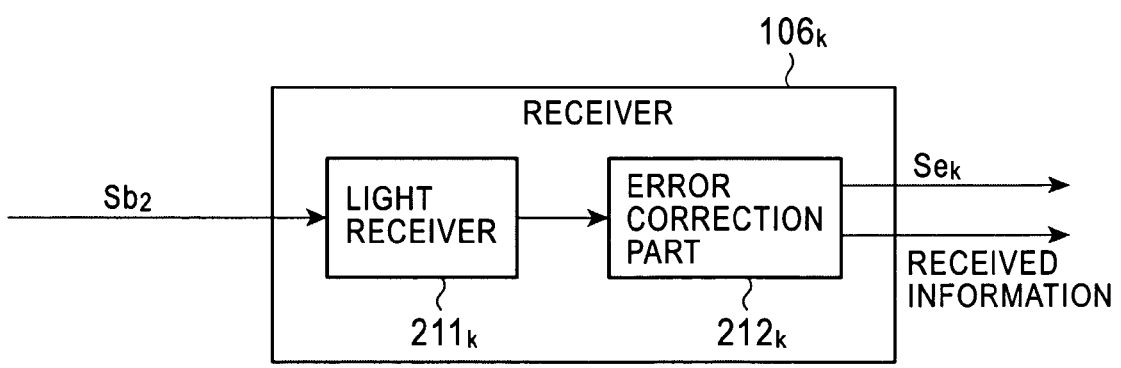

The following is a description of details of each component of the OCDM communication system described above. FIG. 4A is a block diagram illustrating a configuration of a transmitter $101_k$ provided for each channel and FIG. 4B is a block diagram illustrating a configuration of a receiver $106_k$ provided for each channel.

A redundancy imparting part $201_k$ in the transmitter $101_k$ performs encoding for error correction on input transmission information and generates a transmission information signal to which redundancy has been imparted. A light emitter $202_k$ converts the redundant transmission information provided as an electrical signal into an optical signal and provides the optical signal as a transmission optical signal $Sa_k$ to the OCDM line part 103. The light emitter $202_k$ may be implemented, for example, using a pulse light source, an optical modulator, and the like.

A light receiver $211_k$ in the receiver $106_k$ converts an optical signal, which is provided from the OCDM line part 103 through the splitter $105_k$, into an electrical signal. The light receiver $211_k$ may be implemented, for example, using a photo-detector. An error corrector $212_k$ performs decoding for error correction on received information, to which redundancy for error correction has been imparted, included in the output signal of the light receiver $211_k$ to remove redundancy from the received information and outputs the non-redundant received information and calculates a value corresponding to an error rate of the received information obtained through the error correction process and outputs the calculated error rate value as an error information signal $Se_k$. The error information signal $Se_k$ of each channel is provided to the error monitoring part 113. Here, the redundancy imparting part $201_k$ included in the transmitter $101_k$ and the error corrector $212_k$ included in the receiver $106_k$ may each be implemented, for example, using a product "PM5395 CRSU-4×2488" of PMC-Sierra Corporation. The product "PM5395 CRSU-4×2488" is an IC for clock recovery. Functions added to this IC include Forward Error Correction (FEC), impartment of redundancy, output of received information, and output of bit error rate information.

Figure 5:
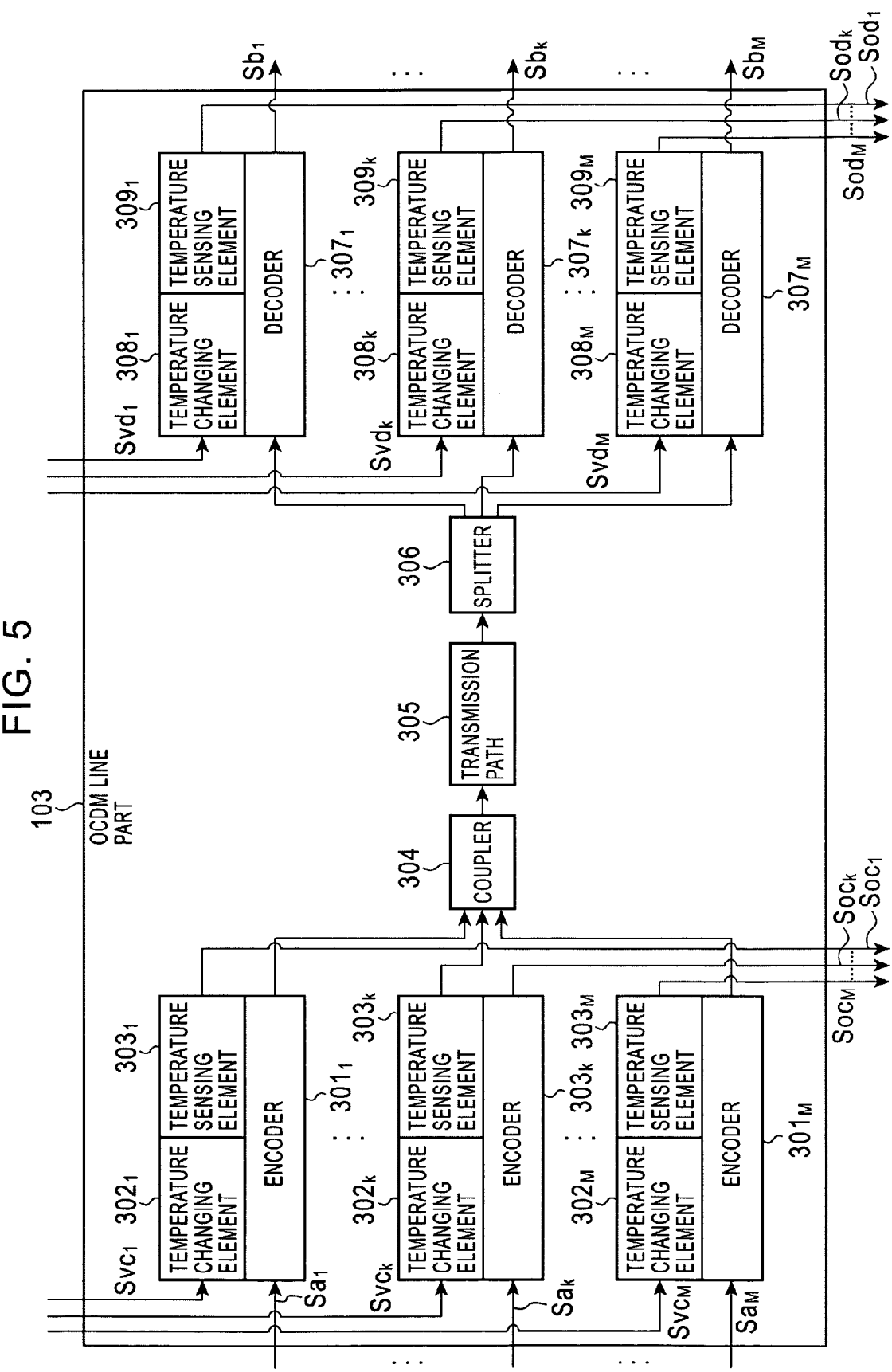
FIG. 5 is a block diagram illustrating a configuration of an OCDM line part 103 according to an embodiment of the present invention.

FIG. 5 is a block diagram illustrating a configuration of the OCDM line part 103. The encoder $301_k$ provided for each channel encodes the transmission optical signal $Sa_k$ transmitted by the transmitter $101_k$ according to a code value assigned to the channel and outputs the encoded signal. The encoder $301_k$ may be implemented, for example, using an SSFBG in which multiple unit fiber Bragg gratings having the same structure are arranged at equal intervals. Each temperature changing element $302_k$ is an element for changing the temperature of the corresponding encoder $301_k$ via heat transfer through contact with the encoder $301_k$. The temperature changing element $302_k$ heats or cools the encoder $301_k$ by changing the temperature of the temperature changing element $302_k$ according to the temperature control signal $Svc_k$ provided from the temperature controller 120. The temperature changing element $302_k$ may be implemented, for example, using a Peltier element. Each temperature detection element $303_k$ monitors the temperature of the corresponding encoder $301_k$ via heat transfer through contact with the encoder $301_k$. The temperature detection element $303_k$ outputs the detected temperature of the encoder $301_k$ as a temperature information signal $Soc_k$ and provides the temperature information signal $Soc_k$ to the set temperature calculator 116. The temperature detection element $303_k$ may be implemented, for example, using a thermistor. Transmission optical signals encoded through the encoders $301_1$ to $301_M$ of all channels are provided to the coupler 304.

The coupler 304 combines the encoded transmission optical signals provided from the encoders $301_1$ to $301_M$ and outputs the resulting signal through one port. The multiplexed transmission optical signal is provided to a splitter 306 via a transmission path 305 including an optical fiber or the like. The splitter 306 separates the optical signal received through the transmission path 305 into a number of signals corresponding to the number of channels M. The separated optical signals are provided to the respective decoders $307_1$ to $307_M$ of the channels.

The decoder $307_k$ provided for each channel decodes an optical signal received through the transmission path 305 according to a code value assigned to the channel and outputs the decoded signal as a received optical signal $Sb_k$. The received optical signal $Sb_k$ is provided to the receiver $106_k$ and the power monitoring part 108 through the splitter $105_k$. Similar to the encoder $301_k$, the decoder $307_k$ may be implemented using an SSFBG in which multiple unit fiber Bragg gratings having the same structure are arranged at equal intervals. Each temperature changing element $308_k$ is an element for changing the temperature of the corresponding decoder $307_k$ via heat transfer through contact with the decoder $307_k$. The temperature changing element $308_k$ heats or cools the decoder $307_k$ by changing the temperature of the temperature changing element $308_k$ according to the temperature control signal $Svd_k$ provided from the temperature controller 120. The temperature changing element $308_k$ may be implemented, for example, using a Peltier element. Each temperature detection element $309_k$ monitors the temperature of the corresponding decoder $307_k$ via heat transfer through contact with the decoder $307_k$. The temperature detection element $309_k$ outputs the detected temperature of the decoder $307_k$ as a temperature information signal $Sod_k$ and provides the temperature information signal $Sod_k$ to the set temperature calculator 116. The temperature detection element $309_k$ may be implemented, for example, using a thermistor.

Figure 6:
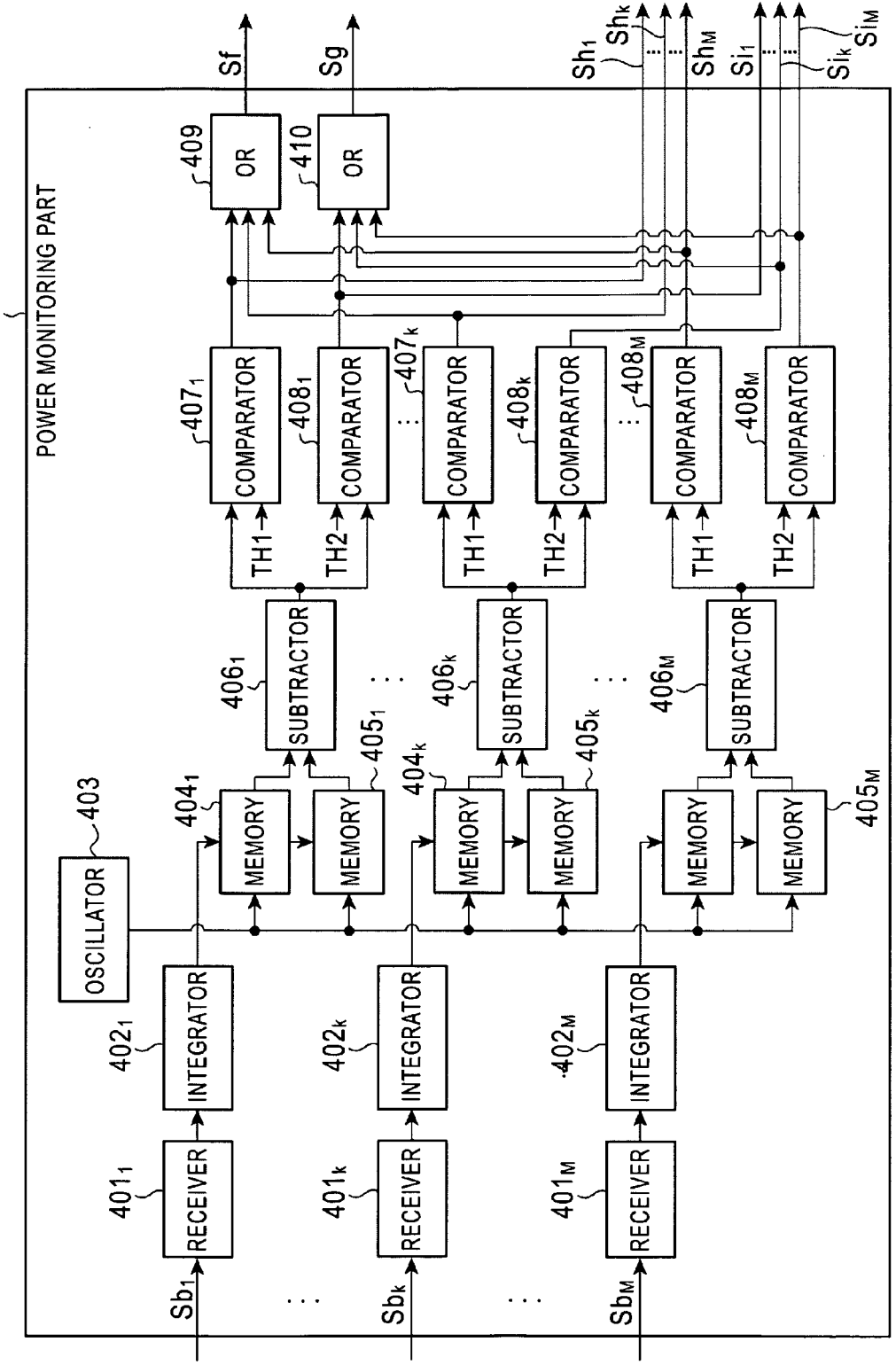
FIG. 6 is a block diagram illustrating a configuration of a power monitoring part according to an embodiment of the present invention.

FIG. 6 is a block diagram illustrating a configuration of the power monitoring part 108. Each light receiver $401_k$ converts the received optical signal $Sb_k$ provided from the OCDM line part 103 through the splitter $105_k$ into an electrical signal and outputs and provides the electrical signal to a corresponding integrator $402_k$. The light receiver $401_k$ may be implemented, for example, using a photo-detector. The integrator $402_k$ integrates the received optical signal provided from the light receiver $401_k$ and outputs a value corresponding to the time average of the amplitude of the received optical signal and provides the value to a corresponding memory $404_k$. The integrator $402_k$ may be implemented, for example, using a low pass filter or the like which is constructed, for example, by combining a capacitor and a coil. An oscillator 403 generates a clock signal having a specific period and provides the clock signal to memories $404_k$ and $405_k$. The memory $404_k$ receives the output value of the integrator $402_k$ at intervals of the period of the clock signal provided from the oscillator 403 and provides a value which has been held in the memory $404_k$ until the output value is received to the memory $405_k$ and a subtractor $406_k$. The memory $405_k$ receives the output value of the memory $404_k$ at intervals of the period of the clock signal provided from the oscillator 403 and provides a value which has been held in the memory $405_k$ until the output value is received to the subtractor $406_k$. The memories $404_k$ and $405_k$ may be implemented, for example, using DRAMs to and from which digital values are input and output. However, it is assumed in this case that the output signal of the integrator $402_k$ is subjected to analog to digital conversion.

The subtractor $406_k$ subtracts the output value of the memory $404_k$ from the output value of the memory $405_k$ and outputs the resulting value. That is, the subtractor $406_k$ outputs the difference between the average powers of the received optical signal at different times, i.e., outputs a value corresponding to a change in the average power of the received optical signal in a predetermined time. The subtractor $406_k$ provides this output value to comparators $407_k$ and $408_k$.

The comparator $407_k$ compares the output value of the subtractor $406_k$ indicating the change of the average power of the received optical signal with a predetermined threshold TH1 and outputs, for example, a logic value of "1" when the output value of the subtractor $406_k$ is greater than the threshold TH1 and outputs a logic value of "0" otherwise. The comparator $408_k$ compares the output value of the subtractor $406_k$ indicating the change of the average power of the received optical signal with a predetermined threshold TH2 and outputs, for example, a logic value of "1" when the output value of the subtractor $406_k$ is less than the threshold TH2 and outputs a logic value of "0" otherwise. That is, whether or not the power of the received optical signal of the channel k has increased is detected through the output value of the comparator $407_k$ and whether or not the power of the received optical signal of the channel k has decreased is detected through the output value of the comparator $408_k$. When the output signals of the comparators $407_k$ and $408_k$ are all "0", the output signals indicate that the power of the received optical signal of the channel k has neither increased nor decreased, i.e., has been kept constant. The output value of the comparator $407_k$ and the output value of the comparator $408_k$ are provided to the set temperature calculator 116 as an individual channel power increase detection signal $Sh_k$ and an individual channel power decrease detection signal $Si_k$, respectively.

An OR gate (or logical sum calculator) 409 outputs the logical sum of the output values of the comparators $407_1$ to $407_M$ corresponding to all channels. The OR gate 409 outputs a logic value of "1" when any of the comparators $407_1$ to $407_M$ outputs a logic value "1", otherwise it outputs a logic value of "0". That is, whether or not the power of the received optical signal has increased in any channel is detected through the output value of the OR gate 409. This output value of the OR gate 409 is provided as a power increase detection signal Sf to the set temperature calculator 116.

An OR gate 410 outputs the logical sum of the output values of the comparators $408_1$ to $408_M$ corresponding to all channels. The OR gate 410 outputs a logic value of "1" when any of the comparators $408_1$ to $408_M$ outputs a logic value "1", otherwise it outputs a logic value of "0". That is, whether or not the power of the received optical signal has decreased in any channel is detected through the output value of the OR gate 410. This output value of the OR gate 410 is provided as a power decrease detection signal Sg to the set temperature calculator 116.

Figure 7:
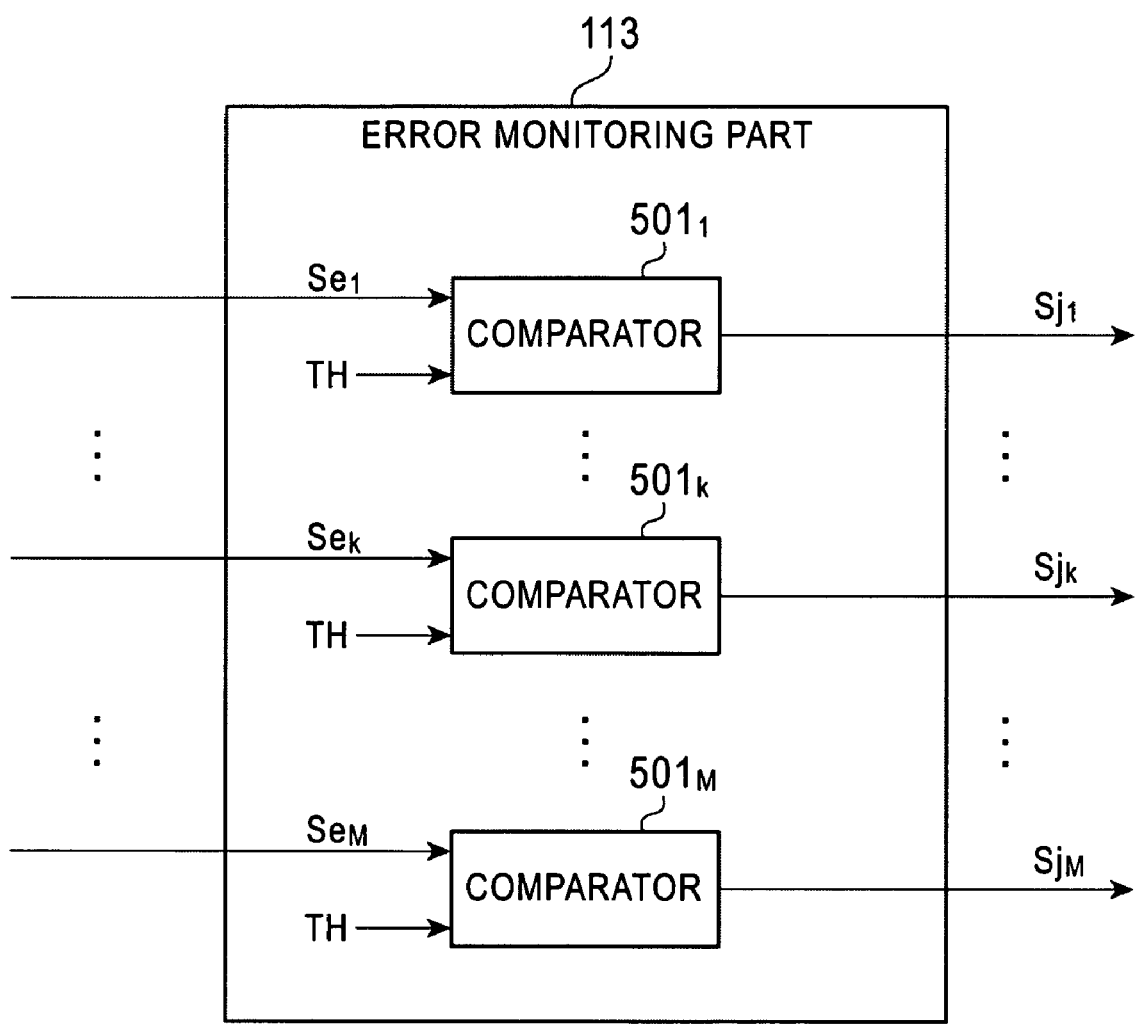
FIG. 7 is a block diagram illustrating a configuration of an error monitoring part according to an embodiment of the present invention.

FIG. 7 is a block diagram illustrating a configuration of the error monitoring part 113. In the error monitoring part 113, a comparator $501_k$ compares the error information signal $Se_k$ indicating the error rate of the received information provided from the receiver $106_k$ with a predetermined threshold TH and outputs, for example, a logic value of "1" when the value indicating the error information signal $Se_k$ is greater than the threshold TH and outputs a logic value of "0" otherwise. That is, whether or not the error rate of the received information of the channel k is abnormal is detected through the output value of the comparator $501_k$. This output value of the comparator $501_k$ is provided as an error detection signal $Sj_k$ to the set temperature calculator 116.

Figure 8:
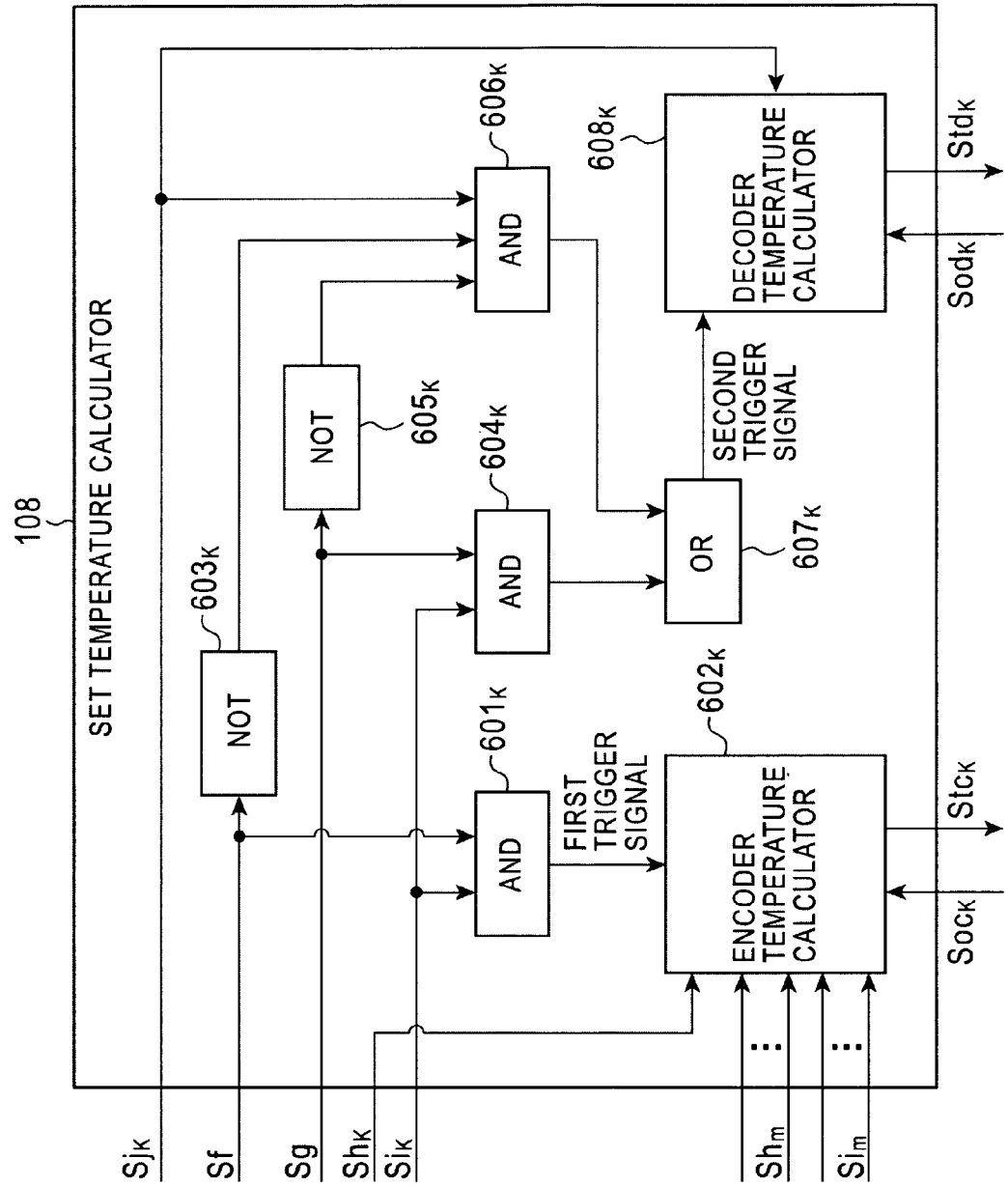
FIG. 8 is a block diagram illustrating a configuration of a set temperature calculator according to an embodiment of the present invention.

FIG. 8 is a block diagram illustrating a configuration of the set temperature calculator 116. The configuration of the set temperature calculator 116 illustrated in FIG. 8 is the configuration of only a portion of the set temperature calculator 116 corresponding to a specific channel k. Here, it is assumed that the set temperature calculator 116 includes components illustrated in FIG. 8 for each channel. An AND gate (or logical product calculator) $601_k$ outputs a logical product of the power increase detection signal Sf indicating whether or not the power of the received optical signal in the channel k has increased and the individual channel power decrease detection signal $Si_k$ indicating whether or not the power of the received optical signal in the channel k has decreased. The AND gate $601_k$ outputs a logic value of "1" when any of the logic values indicated by the input signals Sf and $Si_k$ is "1", i.e., when the power of the received optical signal in any channel has increased or when the power of the received optical signal in the channel k has decreased, otherwise it outputs a logic value of "0". This output signal of the AND gate $601_k$, which will hereinafter be referred to as a "first trigger signal", is provided to an encoder temperature calculator $602_k$.

When a value indicated by the first trigger signal provided from the AND gate $601_k$ is "1", the encoder temperature calculator $602_k$ calculates a set temperature of a corresponding encoder $301_k$ based on each signal input to the encoder temperature calculator $602_k$ and outputs the calculated value as a temperature setting signal $Stc_k$ and provides the temperature setting signal $Stc_k$ to the temperature controller 120. An individual channel power increase detection signal $Sh_k$ indicating whether or not the received optical signal in the channel k has increased, an individual channel power decrease detection signal $Si_k$ indicating whether or not the received optical signal in the channel k has decreased, individual channel power increase detection signals $Sh_m$ for all channels other than the channel k, and individual channel power decrease detection signals $Si_m$ are input to the encoder temperature calculator $602_k$. Here, "m" is a channel number which has a value of 1 to M (excluding k), where "M" is the number of multiplexed channels. A temperature information signal $Soc_k$ indicating the current temperature of the encoder $301_k$ is also input to the encoder temperature calculator $602_k$.

A NOT gate (or logical negation calculator) $603_k$ outputs the logical negation of the power increase detection signal Sf. A NOT gate $605_k$ outputs the logical negation of the power decrease detection signal Sg. An AND gate $604_k$ outputs the logical product of the power decrease detection signal Sg and the individual channel power decrease detection signal $Si_k$ corresponding to the channel k. The AND gate $604_k$ outputs a logic value of "1" when any of the logic values indicated by the signals Sg and $Si_k$ is "1", i.e., when the power of the received optical signal in any channel has decreased or when the power of the received optical signal in the channel k has decreased, otherwise it outputs a logic value of "0".

An AND gate $606_k$ receives the error detection signal $Sj_k$ in the channel k provided from the error monitoring part 113 and the output signals of the NOT gates $603_k$ and $605_k$ and outputs the logical product of the received signals. That is, the AND gate $606_k$ outputs a logic value of "1" when the powers of the received optical signal remain constant in every channel and the error rate of the received signal in the channel k is greater than a predetermined value, otherwise it outputs a logic value of "0". An OR gate $607_k$ outputs the logical sum of the output values of the AND gate $604_k$ and the AND gate $606_k$. The OR gate $607_k$ outputs a logic value of "1" when at least one of the output values of the AND gates $604_k$ and $606_k$ is "1" and outputs a logic value of "0" when both the output values are "0". This output signal of the OR gate $607_k$, which will hereinafter be referred to as a "second trigger signal", is provided to a decoder temperature calculator $608_k$.

The decoder temperature calculator $608_k$ calculates the set temperature of the corresponding decoder $307_k$ based on each signal input to the decoder temperature calculator $608_k$ when the value indicated by the second trigger signal is "1" and outputs the calculated value as a temperature setting signal $Std_k$ and provides the temperature setting signal $Std_k$ to the temperature controller 120. A temperature information signal $Sod_k$ including the current temperature of the encoder $301_k$ and an error detection signal $Sj_k$ indicating whether or not the error rate of the received information of the channel k is higher than a predetermined value are input to the decoder temperature calculator $608_k$.

Figure 9:
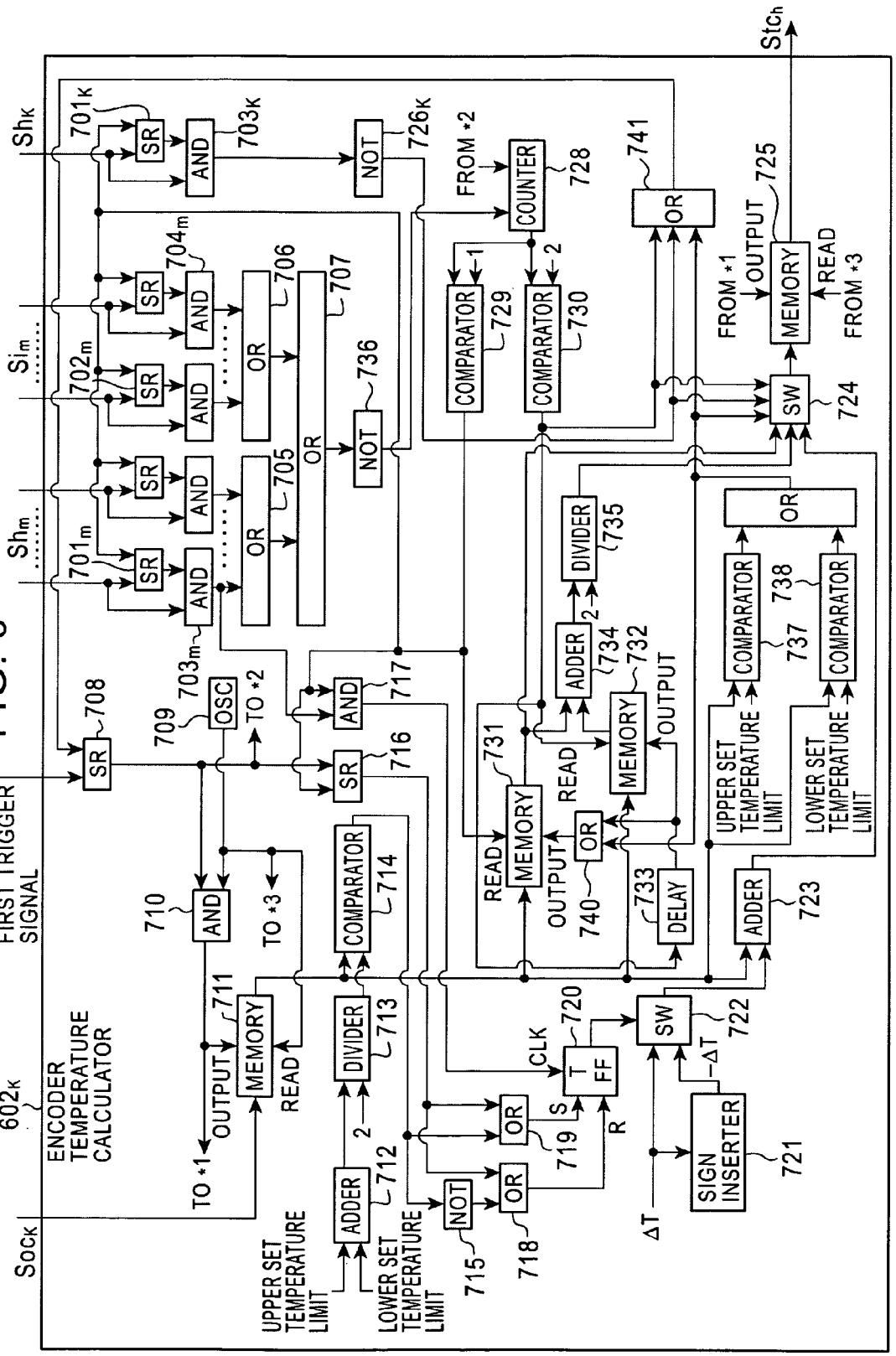
FIG. 9 is a block diagram illustrating a configuration of an encoder temperature calculator according to an embodiment of the present invention.

FIG. 9 is a block diagram illustrating a configuration of each encoder temperature calculator $602_k$ provided in the set temperature calculator 116. Each of the set-reset (SR) flip-flops $701_k$, $701_m$, $702_m$, 708, and 716 outputs a logic value of "1" when a logic value of "1" is input to an S port thereof, outputs a logic value of "0" when a logic value of "1" is input to an R port thereof, and maintains and outputs an immediately previous output logic value when a logic value of "0" is input to both the S and R ports. The individual channel power increase detection signal $Sh_k$ indicating whether or not the received optical signal in the channel k has increased is input to the S port of the SR flip-flop $701_k$ and the output signal of a comparator 729 is input to the R port of the SR flip-flop $701_k$, and the output of the SR flip-flop $701_k$ is provided to an AND gate $703_k$. The individual channel power increase detection signal $Sh_m$ of each channel other than the channel k is input to the S port of a corresponding SR flip-flop $701_m$ and the output signal of the comparator 729 is input to the R port of the SR flip-flop $701_m$, and the output of the SR flip-flop $701_m$ is provided to a corresponding AND gate $703_m$. The individual channel power decrease detection signal $Si_m$ of each channel other than the channel k is input to the S port of a corresponding SR flip-flop $702_m$ and the output signal of the comparator 729 is input to the R port of the SR flip-flop $702_m$, and the output of the SR flip-flop $702_m$ is provided to a corresponding AND gate $704_m$.

The AND gate $703_k$ outputs a logical product of the individual channel power increase detection signal $Sh_k$ and the output value of the SR flip-flop $701_k$. Each AND gate $703_m$ outputs a logical product of the individual channel power increase detection signal $Sh_m$ of a corresponding one of the channels other than the channel k and the output value of the corresponding SR flip-flop $701_m$. Each AND gate $704_m$ outputs a logical product of the individual channel power decrease detection signal $Si_m$ of a corresponding one of the channels other than the channel k and the output value of the corresponding SR flip-flop $702_m$.

An OR gate 705 outputs the logical sum of the output values of the AND gates $703_m$. An OR gate 706 outputs the logical sum of the output values of the AND gates $704_m$. An OR gate 707 outputs the logical sum of the output values of the OR gates 705 and 706. A NOT gate 736 outputs the logical negation of the output value of the OR gate 707.

The first trigger signal is input to an S port of an SR flip-flop 708 and an output signal of an OR gate 741 is input to an R port thereof. An oscillator 709 generates a clock signal having a periodic waveform which alternates between a voltage level corresponding to a logic value of "1" and a voltage level corresponding to a logic value of "0". An SR flip-flop 701 outputs the logical product of the output signal of the SR flip-flop 708 and the output signal of the oscillator 709. A memory 711 is a means for storing the value of the temperature information signal $Soc_k$ indicating the monitored temperature value of the encoder $301_k$ of the channel k provided from the OCDM line part 103. The memory 711 reads the value of the temperature information signal $Soc_k$ at each rising edge of the clock signal provided from the oscillator 709 and updates the currently stored value with the read value, and outputs the stored value at each rising edge of the output signal of the AND gate 710. The output value of the memory 711 is provided to comparators 714, 737, and 738, a memory 731, and an adder 723.

An adder 712 is a means for calculating and outputting the algebraic sum of input signals. An upper limit and a lower limit of a range of temperatures that can be set as the set temperature of the encoder $301_k$ are input to the adder 712. The adder 712 outputs the algebraic sum of the upper and lower limits of the set temperature range and provides the algebraic sum to a divider 713. The divider 713 divides the output value of the adder 712 by 2 and outputs the resulting value. That is, the divider 713 outputs a middle value of the range of temperatures that can be set as the set temperature of the encoder $301_k$. This output signal of the divider 713 is provided to the comparator 714.

The comparator 714 outputs a logic value of "1" when a monitored temperature value at a specific time of the encoder $301_k$ provided from the memory 711 is higher than the middle value of the range of temperatures that can be set for the encoder $301_k$ provided from the divider 713, otherwise it outputs a logic value of "0". This output signal of the comparator 714 is input to an S port of a toggle (T) flip-flop 720 via an OR gate 719 and is input to an R port thereof via a NOT gate 715 and an OR gate 718. An SR flip-flop 716 receives an output signal of a comparator 729 through an S port of the SR flip-flop 716 and receives an output signal of the SR flip-flop 708 through an R port thereof and performs the same logical operation as described above according to logic values indicated by the input signals.

An AND gate 717 outputs the logical sum of the output signal of the OR gate 705 and the output signal of the comparator 729 and provides the logical sum to a CLK port of the T flip-flop 720.

The NOT gate 715 outputs the logical negation of the output signal of the comparator 714. The OR gate 718 outputs the logical sum of the output signal of the NOT gate 715 and the output signal of the SR flip-flop 716. The OR gate 719 outputs the logical sum of the output signal of the comparator 714 and the output signal of the SR flip-flop 716. The T flip-flop 720 outputs a logic value of "1" when a logic value of "1" is input to the S port and a logic value of "0" is input to the R port, outputs a logic value of "0" when a logic value of "0" is input to the S port and a logic value of "1" is input to the R port, and inverts and outputs an immediately previous output logic value of the T flip-flop 720 at each rising edge of a signal input to the CLK port when a logic value of "1" is input to both the S and R ports. The output signal of the OR gate 719 is input to the S port of the T flip-flop 720, the output signal of the OR gate 718 is input to the R port thereof, and the output signal of the AND gate 717 is input to the CLK port thereof.

A signal corresponding to a numerical value indicating the amount of change in the temperature ΔT of the encoder $301_k$ when the encoder $301_k$ is heated or cooled through the temperature changing element $302_k$ is provided to a sign inverter 721 and a switch 722. The sign inverter 721 is a means for reversing the sign of the numerical value indicating the input amount of temperature change ΔT and outputting a numerical value indicating the negative amount of temperature change. For example, when the amount of temperature change ΔT is expressed by a binary value, a value expressed by inverting the binary value "1" or "0" of each digit of the binary value is referred to as a "complement number" and is equal to a value obtained by reversing the sign of the original value. Thus, the sign inverter 721 may be implemented, for example, using an XOR circuit. Here, a positive temperature change is treated as heating and a negative temperature change is treated as cooling. Both the value indicating the positive amount of temperature change ΔT and the value indicating the negative amount of temperature change −ΔT are input to the switch 722. The switch 722 outputs one of the two input values according to a logic value output from the T flip-flop 720. The adder 723 adds the value of the amount of temperature change ΔT (or −ΔT) provided from the switch 722 to the monitored temperature value of the encoder $301_k$ provided from the memory 711 and outputs the added value. The output value of the adder 723 is provided to the switch 724.

A counter 728 is a means for counting three values "0", "1", and "2" in the named order at each rising edge of the output signal of the NOT gate 736 and outputting the count value. The counter 728 initializes the output value to "0" when the logic value provided from the SR flip-flop 708 is changed to "1". The comparator 729 receives the count value provided from the counter 728 and outputs a logic value of "1" when the input value is "1", otherwise it outputs a logic value of "0". The comparator 730 receives the count value provided from the counter 728 and outputs a logic value of "1" when the input value is "2", otherwise it outputs a logic value of "0".

The memory 731 reads the value of the temperature information signal $Soc_k$ output from the memory 711 at each rising edge of the output signal of the comparator 729 and updates the currently stored value with the read value and outputs the stored value at each rising edge of the output signal of the OR gate 740. The output value of the memory 731 is provided to the switch 724 and the adder 734. A memory 732 reads the value of the temperature information signal $Soc_k$ output from the memory 711 at each rising edge of the output signal of the comparator 730 and updates the currently stored value with the read value and outputs the stored value at each rising edge of the output signal of a delayer 733. The delayer 733 delays the output signal of the comparator 730 by a predetermined time and outputs the delayed signal. The adder 734 outputs the algebraic sum of the output values of the memory 731 and the memory 732. A divider 735 divides the output value of the adder 734 by 2 and outputs the resulting value.

The comparator 737 outputs a logic value of "1" when the monitored temperature value of the encoder $301_k$ provided from the memory 711 is higher than the upper limit of the range of set temperatures of the encoder $301_k$, otherwise it outputs a logic value of "0". The comparator 738 outputs a logic value of "1" when the monitored temperature value of the encoder $301_k$ provided from the memory 711 is less than the lower limit of the range of set temperatures of the encoder $301_k$, otherwise it outputs a logic value of "0". The OR gate 739 outputs the logical sum of the output values of the comparators 737 and 738. That is, the OR gate 739 outputs a logic value of "1" when the monitored temperature value of the encoder $301_k$ provided from the memory 711 is higher than the upper limit of the range of set temperatures of the encoder $301_k$ or less then the lower limit thereof, otherwise it outputs a logic value of "0". The OR gate 740 outputs the logical sum of the output values of the OR gate 739 and the delayer 733. The OR gate 741 outputs the logical sum of the output values of the comparator 730 and the OR gate 739. The output signal of the OR gate 741 is provided to the R port of the SR flip-flop 708 as a signal indicating reset of the process for calculating the set temperature value of the encoder by the set temperature calculator 116.

The switch 724 selects and outputs the output signal of the adder 723 when the output logic value of the NOT gate 726 input to the switch 724 is "1", selects and outputs the output signal of the divider 735 when the output logic value of the comparator 730 input to the switch 724 is "1", and selects and outputs the output signal of the memory 731 when the output logic value of the OR gate 739 input to the switch 724 is "1". A memory 725 reads the output value of the switch 724 at each rising edge of the clock signal provided from the oscillator 709 and updates the currently stored value with the read value and outputs the stored value at each rising edge of the output signal of the AND gate 710. This output signal of the memory 725 is provided to the temperature controller 120 as a temperature setting signal $Stc_k$ indicating the value of the set temperature of the encoder $301_k$ of the channel k.

Figure 10:
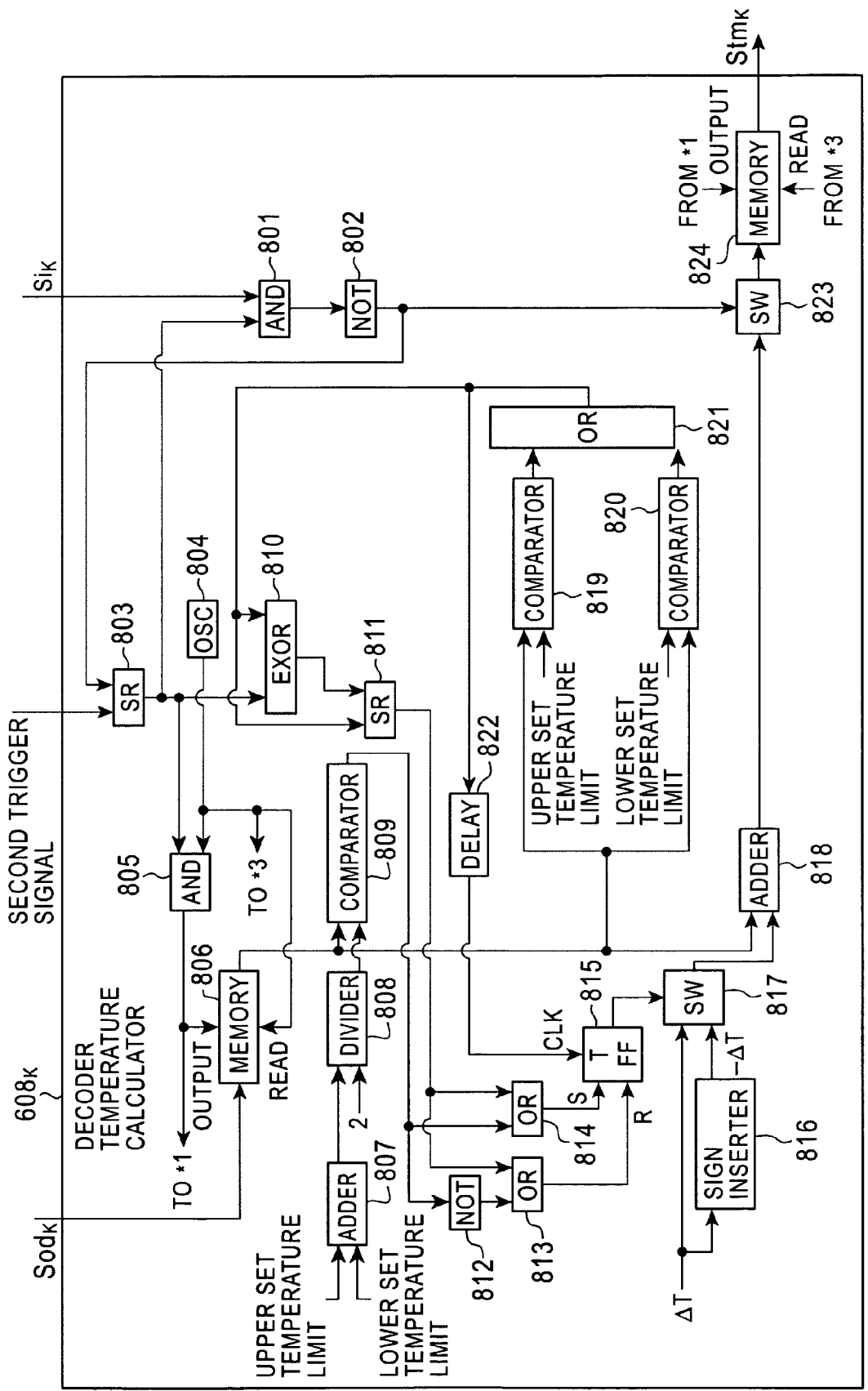
FIG. 10 is a block diagram illustrating a configuration of a decoder temperature calculator according to an embodiment of the present invention.

FIG. 10 is a block diagram illustrating a configuration of each decoder temperature calculator $608_k$ in the set temperature calculator 116. In the decoder temperature calculator $608_k$, an AND gate 801 outputs the logical sum of an output signal of an SR flip-flop 803 and an error detection signal $Sj_k$ indicating whether or not the error rate of the received information in the channel k, which is provided from the error monitoring part 113, is higher than a predetermined value. An NOT gate 802 outputs the logical negation of the output signal of the AND gate 801 and provides the logical sum to a switch 823 and an SR flip-flop 803.

Each of the SR flip-flops 803 and 811 outputs a logic value of "1" when a logic value of "1" is input to an S port thereof, outputs a logic value of "0" when a logic value of "1" is input to an R port thereof, and maintains and outputs an immediately previous output logic value when a logic value of "0" is input to both the S and R ports. A second trigger signal is input to an S port of the SR flip-flop 803 and the output signal of the NOT gate 802 is input to an R port thereof.

An oscillator 804 generates a clock signal having a periodic waveform which alternates between a voltage level corresponding to a logic value of "1" and a voltage level corresponding to a logic value of "0". An AND gate 805 outputs the logical product of the output signal of the SR flip-flop 803 and the output signal of the oscillator 804. A memory 806 is a means for storing the value of the temperature information signal $Sod_k$ indicating the monitored temperature value of the decoder $307_k$ of the channel k provided from the OCDM line part 103. The memory 806 reads the value of the temperature information signal $Sod_k$ at each rising edge of the clock signal provided from the oscillator 804 and updates the currently stored value with the read value, and outputs the stored value at each rising edge of the output signal of the AND gate 805.

The output value of the memory 806 is provided to comparators 809, 819, and 820, a memory 731, and an adder 818.

An adder 807 is a means for calculating and outputting the algebraic sum of input signals. An upper limit and a lower limit of a range of temperatures that can be set as the set temperature of the decoder $307_k$ are input to the adder 807. The adder 807 outputs the algebraic sum of the upper and lower limits of the set temperature range and provides the algebraic sum to a divider 808. The divider 808 divides the output value of the adder 807 by 2 and outputs the resulting value. That is, the divider 808 outputs a middle value of the range of temperatures that can be set as the set temperature of the decoder $307_k$. This output signal of the divider 808 is provided to the comparator 809.

The comparator 809 outputs a logic value of "1" when a monitored temperature value of the decoder $307_k$ provided from the memory 806 is higher than the middle value of the range of temperatures that can be set for the decoder $307_k$ provided from the divider 808, otherwise it outputs a logic value of "0". This output signal of the comparator 809 is input to an S port of a T flip-flop 815 via an OR gate 814 and is provided to an R port thereof via a NOT gate 812 and an OR gate 813.

An XOR gate 810 outputs the exclusive logical sum of a logic value provided from the SR flip-flop 803 and a logic value provided from an OR gate 821. An SR flip-flop 811 receives an output signal of the OR gate 821 through an S port of the SR flip-flop 811 and receives an output signal of the XOR gate 810 through an R port thereof and performs the same logical operation as described above according to logic values indicated by the input signals.

The NOT gate 812 outputs the logical negation of the output signal of the comparator 809. The OR gate 813 outputs the logical sum of the output signal of the NOT gate 812 and the output signal of the SR flip-flop 811. The OR gate 814 outputs the logical sum of the output signal of the comparator 809 and the output signal of the SR flip-flop 811. The T flip-flop 815 outputs a logic value of "1" when a logic value of "1" is input to the S port and a logic value of "0" is input to the R port, outputs a logic value of "0" when a logic value of "0" is input to the S port and a logic value of "1" is input to the R port, and inverts and outputs an immediately previous output logic value of the T flip-flop 815 at each rising edge of a signal input to the CLK port when a logic value of "1" is input to both the S and R ports. The output signal of the OR gate 814 is input to the S port of the T flip-flop 815, the output signal of the OR gate 813 is input to the R port thereof, and the output signal of a delayer 822 is input to the CLK port thereof.

A signal corresponding to a numerical value indicating the amount of change in the temperature $\Delta T$ of the decoder $307_k$ when the decoder $307_k$ is heated or cooled through the temperature changing element $308_k$ is provided to a sign inverter 816 and a switch 817. The sign inverter 816 is a means for reversing the sign of the numerical value indicating the input amount of temperature change $\Delta T$ and outputs a numerical value indicating the negative amount of temperature change. The sign inverter 816 may be implemented, for example, using an XOR circuit. Here, a positive temperature change is treated as heating and a negative temperature change is treated as cooling. Both the value indicating the positive amount of temperature change $\Delta T$ and the value indicating the negative amount of temperature change $-\Delta T$ are input to the switch 817. The switch 817 outputs one of the two input values according to a logic value output from the T flip-flop 815. The adder 818 adds the value of the amount of temperature change $\Delta T$ (or $-\Delta T$) provided from the switch 817 to the monitored temperature value of the decoder $307_k$ provided from the memory 806 and outputs the added value. The output value of the adder 818 is provided to the switch 823.

The comparator 819 outputs a logic value of "1" when the monitored temperature value of the decoder $307_k$ provided from the memory 806 is higher than the upper limit of the range of set temperatures of the decoder $307_k$, otherwise it outputs a logic value of "0". The comparator 820 outputs a logic value of "1" when the monitored temperature value of the decoder $307_k$ provided from the memory 806 is less than the lower limit of the range of set temperatures of the decoder $307_k$, otherwise it outputs a logic value of "0". The OR gate 821 outputs the logical sum of the output values of the comparators 819 and 820. That is, the OR gate 821 outputs a logic value of "1" when the monitored temperature value of the decoder $307_k$ provided from the memory 806 is higher than the upper limit of the range of set temperatures of the decoder $307_k$ or less then the lower limit thereof, otherwise it outputs a logic value of "0". This output of the OR gate 821 is provided to the XOR gate 810, the S port of the SR flip-flop 811, and the delayer 822. The delayer 822 delays the signal provided from the OR gate 821 by a predetermined time and provides the delayed signal to the CLK port of the T flip-flop 815.

The switch 823 outputs the output signal of the adder 818 when the output logic value of the NOT gate 802 input to the switch 823 is "1" and stops transmission of the output signal when the input logic value is "0". A memory 824 reads the output value of the switch 823 at each rising edge of the clock signal provided from the oscillator 804 and updates the currently stored value with the read value and outputs the stored value at each rising edge of the output signal of the AND gate 805. This output signal of the memory 824 is provided to the temperature controller 120 as a temperature setting signal $Std_k$ indicating the value of the set temperature of the decoder $307_k$ of the channel k.

(Principle of Detection of Failure of Encoder and Principle of Correction of Failure)

1. Relationship Between Average Power of Received Optical Signal and Change of Code Value In the OCDM communication system according to the present invention constructed as described above, whether or not code values for encoding and decoding are equal is determined based on the average power of a received optical signal. The average power of a received optical signal is obtained by dividing energy of the received optical signal measured in a specific time by the measured time. Here, the average power of the received optical signal can be considered proportional to a value obtained by dividing optical energy after encoding and decoding of one pulse by a bit period in the case where the measured time is sufficiently long and the influence of a power change due to a change in the rates of generation of logic values "1" and "0" or a power change due to noise or the like upon the average power of the received optical signal is sufficiently small (i.e., smaller than an average power measurement error). That is, when the average power of the received optical signal is denoted by $P_{av}$, $P_{av}$ can be expressed as follows.

$$P_{av} \propto \frac{1}{Tb} \int_{-\infty}^{\infty} |D'(t)|^2 dt \qquad (8)$$

Here, Tb is the bit period.

Figure 11:
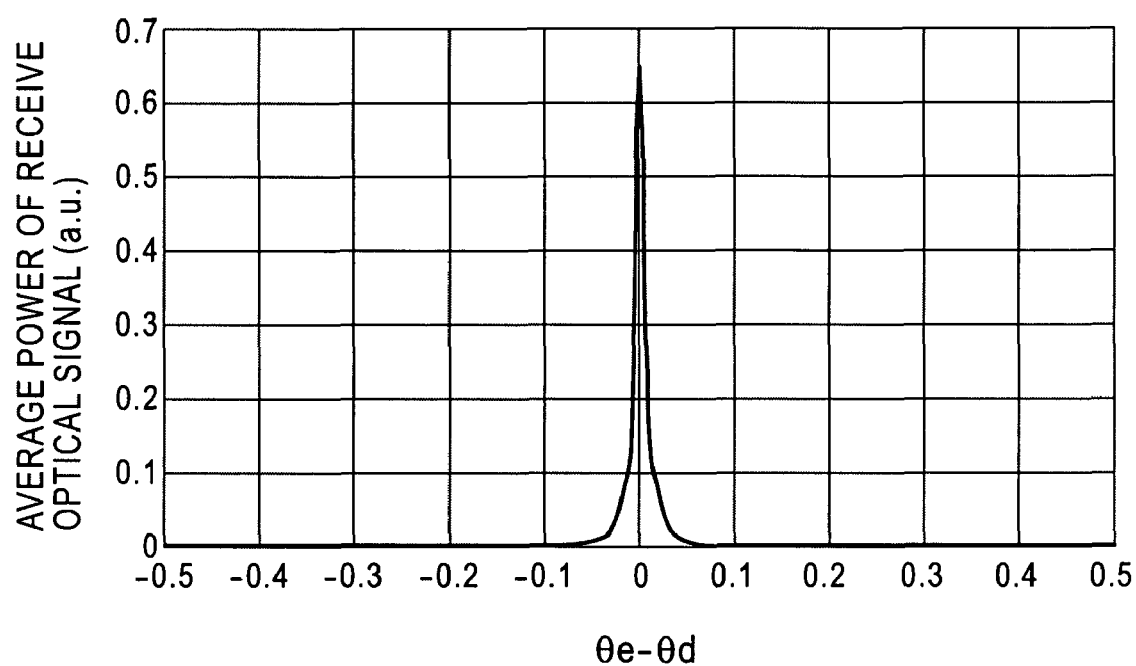
FIG. 11 illustrates a relationship between the code value and the average power of a received optical signal.

FIG. 11 illustrates a relationship between the code value and the average power of the received optical signal obtained from Equations (6), (7), and (8) when the number of chips N is 32 and the bit period Tb is 2NTc, where Tc is a time interval between adjacent chip pulses). In FIG. 11, the horizontal axis represents $\theta_e - \theta_d$ which is normalized by ½π (i.e., $(\theta_e - \theta_d)/2\pi$ is expressed on the horizontal axis). Here, $\theta_e - \theta_d = 0$ indicates that $\theta_e = \theta_d$ and indicates that the phase difference between adjacent chip pulses of the encoder is equal to the phase difference between adjacent chip pulses of the decoder, i.e., that the code values set for the encoder and the decoder are equal. In the case of transmission and reception of a single channel, the average power of the received optical signal is maximized when the code values of the encoder and the decoder are equal. The average power of the received optical signal increases as the difference between the code values of the encoder and the decoder decreases and the average power monotonously decreases as the difference between the code values increases. The average power of the received optical signal is minimized when the difference between the code values is ±π. The relationship between the difference between the code values for encoding and decoding and the average power of the received optical signal is monotonous as described above. Therefore, when a code value of an encoder $301_k$ (or a decoder $307_k$) in the OCDM line part 103 has changed during communication, it is possible to specify the encoder or the decoder, the code value of which has changed, as described below.

2. Relationship Between Code Value and Temperature of Encoder

In this encoding scheme, every $\theta_j$ (j=1 to N−1) is replaced with θ and every Lj is replaced with L in Equation (2) since all phase differences between adjacent chip pulses are equal. That is, the phase difference θ and the distance L between unit gratings satisfy the following relationship.

$$\theta = \frac{4\pi n_{eff} L}{\lambda_0} + 2\pi n \qquad (9)$$

A change δθ of the code value θ with respect to a change of the temperature of the encoder is expressed as follows using the temperature dependency of the effective index of refraction $n_{eff}$ and the temperature dependency of the distance L between unit gratings.

$$\delta\theta = \frac{4\pi}{\lambda_0}\left(\frac{\partial n_{eff}}{\partial T}L + n_{eff}\frac{\partial L}{\partial T}\right)\delta T \qquad (10)$$

Here, T is temperature and δT is temperature change. The relationship of change of the code value and change of the temperature according to Equation (10) is monotonous. That is, the change of the code value allocated to the encoder or the decoder is caused by temperature change, and, when a code value has changed, it is possible to correct the code value to an appropriate code value by individually adjusting the temperatures of the encoder and the decoder. In this case, a range of temperature T in which the (positive or negative) sign of δθ•δT is not changed is set as an operating range.

3. Specifying Failed Encoder Through Monitoring of Average Power of Received Optical Signal Let us consider the case where a failure has occurred in an encoder or a decoder of a channel x in a communication state in which a plurality of channels including channels x, y1, and y2 are multiplexed. Here, it is assumed that respective optical signal powers of all channels are appropriately controlled when all encoders and decoders are normal. It is also assumed that the probability that a plurality of encoders or decoders have simultaneously failed is sufficiently smaller than the probability that a single encoder or decoder has failed. Table 1 illustrates the case where an encoder of the channel x has failed and Table 2 illustrates the case where a decoder of the channel x has failed.

TABLE 1

Change of power of received optical signal and change of code value when encoder of channel x has failed

| change of code value of encoder of | change of power of received optical signal | | |
|---|---|---|---|
| channel x | channel x | channel y1 | channel y2 |
| x→y1 | ↓ (1) | ↑ (2) | — (3) |
| x→z | ↓ (4) | — (5) | — (6) |

TABLE 2

Change of power of received optical signal and change of code value when decoder of channel x has failed

| change of code value of decoder of | change of power of received optical signal | | |
|---|---|---|---|
| channel x | channel x | channel y1 | channel y2 |
| x→y1 | — (7) | — (8) | — (9) |
| x→z | ↓ (10) | — (11) | — (12) |

Here, the symbol "x" denotes a code value allocated to the channel x before a failure has occurred, the symbols "y1" and "y2" denote code values allocated respectively to channels y1 and y2, and the symbol "z" denotes an unused code value which has not been allocated to any channel. In each table, "-" indicates that the average power of the received optical signal has not changed due to occurrence of a failure in the encoder or the decoder. The up arrow in each of the tables indicates that the average power of the received optical signal has increased due to occurrence of a failure in the encoder or the decoder. The down arrow in each of the tables indicates that the average power of the received optical signal has decreased due to occurrence of a failure in the encoder or the decoder.

First, with reference to Table 1, let us discuss the case where the code value of the encoder of the channel x has changed from x to y1 when the encoder has failed. The channel x undergoes a change from a code value matching state, in which the code values of the encoder and the decoder are all equal to x, to a code value mismatch state in which the code values are different due to the change of the code value of the encoder to y1. Accordingly, the average power of an optical signal received by a receiver of the channel x is less than that of the normal state (1). On the other hand, the channel y1 changes from a code value mismatch state of the code values of the encoder of the channel x and the decoder of the channel y1 to a code value matching state due to the change of the code value of the encoder of the channel x from x to y1. Accordingly, the average power of an optical signal received by a receiver of the channel y1 is less than that of the normal state (2). The channel y2 does not undergo any change in the code value matching state and the code value mismatch state even though the code value of the encoder of the channel x has changed from x to y1 since the code value of the decoder is y2. Accordingly, the average power of an optical signal received by a receiver of the channel y2 does not change (3).

Next, let us discuss the case where the code value of the encoder of the channel x has changed from x to z. The channel x undergoes a change from a code value matching state, in which the code values of the encoder and the decoder are all equal to x, to a code value mismatch state in which the code values are different due to the change of the code value of the encoder to z. Accordingly, the average power of an optical signal received by a receiver of the channel x is less than that of the normal state (4). On the other hand, each of the channel y1 and y2 does not undergo any change in the code value matching state and the code value mismatch state even though the code value of the encoder of the channel x has changed from x to z since the code value of the decoder is y1 or y2. Accordingly, the average power of an optical signal received by a receiver of each of the channels y1 and y2 does not change (5) and (6).

Next, with reference to Table 2, let us discuss the case where the code value of the decoder of the channel x has changed from x to y1 when the decoder has failed. The channel x undergoes a change from a state in which the code value of the decoder of the channel x is equal to the code value of the encoder of the channel x to a state in which the code value of the decoder of the channel x is equal to the code value of the encoder of the channel y1. Accordingly, the power of an optical signal received by a receiver of the channel x does not change (7). On the other hand, since signals for decoding in the channel y1 and y2 do not change even when the code value of the decoder of the channel x has changed, the power of an optical signal received by a receiver of each of the channels y1 and y2 does not change (8) and (9).

Next, let us discuss the case where the code value of the decoder of the channel x has changed from x to z. The channel x undergoes a code value matching state, in which the code values of the encoder and the decoder are all equal to x, to a code value mismatch state in which the code values are different due to the change of the code value of the decoder to z. Accordingly, the power of an optical signal received by a receiver of the channel x is less than that of the normal state (10). On the other hand, since signals for decoding in the channel z and y2 do not change even when the code value of the decoder of the channel x has changed, the power of an optical signal received by a receiver of each of the channels z and y2 does not change (11) and (12).

In the communication system according to the present invention, it is possible to specify an encoder or a decoder, in which a failure has occurred, by monitoring changes in powers of received optical signals as described below since a change in a code value allocated to an encoder or a decoder and a change in the power of a received optical signal of each channel has the relationships illustrated in Tables 1 and 2.

(i) In the case where the average power of a received optical signal in one channel has decreased and the average power of a received optical signal in another channel has increased, it is possible to determine that a failure has occurred in an encoder in the channel in which the average power of the received optical signal has decreased. Here, it is also possible to determine that a code value of the failed encoder has changed from an original code value to a code value for allocation to the channel in which the average power of the received optical signal has increased.

(ii) In the case where the average power of a received optical signal in one channel has decreased and the average powers of received optical signals in all other channels have not changed, it is possible to determine that a failure has occurred in an encoder or a decoder in the channel in which the average power of the received optical signal has decreased. Here, it is also possible to determine that a code value of the failed encoder or decoder has changed from an original code value to an unused code value that has not been allocated to any channel.

(iii) In the case where the powers of received optical signals of all channels have not changed, it is not possible to determine whether the communication system continues to operate normally or a failure has occurred in the decoder.

In the OCDM communication system according to the present invention, the power monitoring part 108 monitors changes in the average powers of received optical signal in all channels to determine whether or not changes in the average powers of the received optical signals as described above in (i) to (iii) have occurred. In the case where such a change in the power of the received optical signal is detected, a channel in which a failure has occurred is specified and a code value of an encoder or a decoder of the channel, which has been specified as having failed, is corrected by controlling the temperature of the encoder or the decoder to reach a value calculated by the set temperature calculator 116, thereby achieving restoration of communication.

(Operation of OCDM Communication System According to the Present Invention)

The operation of the OCDM communication system according to an embodiment of the present invention is described below.

1. Method for Determining Encoder or Decoder that is to be Subjected to Temperature Control First, a method for determining an encoder or a decoder that is to be subjected to temperature control in the OCDM communication system according to the present invention is described as follows with reference to a flow chart of FIG. 12.

First, whether or not the average power of a received optical signal $Sb_k$ in any channel has increased is determined (step S1). Received information of each channel provided from the OCDM line part 103 is decoded and then provided as a received optical signal $Sb_k$ to the power monitoring part 108. The light receiver $401_k$ and the integrator $402_k$ in the power monitoring part 108 are means for obtaining an average power of the received optical signal $Sb_k$. The memories $404_k$ and $405_k$ output values indicating respective average powers of received optical signals at different times and the subtractor $406_k$ outputs the difference between these values. A temporal change in the average power of the received optical signal is obtained in this manner. The comparator $407_k$ is used to determine whether or not the average power of the received optical signal in the channel k has increased. The comparator $407_k$ outputs a logic value of "1" indicating that the average power of the received optical signal has increased when the temporal change in the average power of the received optical signal input to the comparator $407_k$ is higher than a threshold TH1. Although the threshold TH1 may be set to "0" when it is only necessary to determine that the power has increased, it is preferable that the threshold TH1 be set to a value higher than "0" taking into consideration that the power of the received optical signal randomly fluctuates due to influence of noise or the like. The comparator $408_k$ is used to determine whether or not the average power of the received optical signal in the channel k has decreased. The comparator $408_k$ outputs a logic value of "1" indicating that the average power of the received optical signal has decreased when the temporal change in the average power of the received optical signal input to the comparator $408_k$ is lower than a threshold TH2. Although the threshold TH2 may be set to "0" when it is only necessary to determine that the power has decreased, it is preferable that the threshold TH2 be set to a value lower than "0" taking into consideration that the power of the received optical signal randomly fluctuates due to influence of noise or the like. The output of the comparator $407_k$ is provided to the set temperature calculator 116 and is also provided as an individual channel power increase detection signal $Sh_k$ to the set temperature calculator 116. The OR gate 409 calculates the logical sum of the output values of the comparators $407_1$ to $407_M$ of all channels. That is, the OR gate 409 outputs a logic value of "1" when the power of a received optical signal of any channel has increased, otherwise it outputs a logic value of "0", and provides the output logic value as a power increase detection signal Sf to the set temperature calculator 116. On the other hand, the output of the comparator $408_k$ is provided to the set temperature calculator 116 and is also provided as an individual channel power decrease detection signal $Si_k$ to the set temperature calculator 116. The OR gate 410 calculates the logical sum of the output values of the comparators $408_1$ to $408_M$ of all channels. That is, the OR gate 410 outputs a logic value of "1" when the power of a received optical signal of any channel has decreased, otherwise it outputs a logic value of "0", and provides the output logic value as a power decrease detection signal Sg to the set temperature calculator 116. At step S1, the determination as to whether or not the average of the received optical signal $Sb_k$ in any channel has increased is achieved through detection of the power increase detection signal Sf by the set temperature calculator 116.

Next, when it is determined at step S1 that the average power of the received optical signal $Sb_k$ in a channel has increased, a channel in which the average power of the received optical signal $Sb_k$ has decreased is specified (step S2). The specification of the channel in which the received optical signal $Sb_k$ has decreased is achieved through detection of the individual channel power decrease detection signal $Si_k$ by the set temperature calculator 116.

Next, it is determined that a failure has occurred in an encoder of the channel specified at step S2, since the encoder of the specified channel corresponds to the failed encoding described above in (i), and the encoder is determined to be subjected to temperature control (i.e., determined to be a temperature control target) (step S3). The processes of steps S1 to S3 are achieved through calculation of the logical product of the individual channel power increase detection signal $Sh_k$ and the individual channel power decrease detection signal $Si_k$ by the AND gate $601_k$. When the channel to be subjected to temperature control has been specified, an AND gate $601_k$ corresponding to the channel to be subjected to temperature control transmits a first trigger signal to a corresponding encoder temperature calculator $602_k$. The first trigger signal acts as a trigger causing the encoder temperature calculator $602_k$ to start a process for calculating a set temperature of the encoder to be subjected to temperature control.

Next, when it is not determined at step S1 that the average power of the received optical signal $Sb_k$ in any channel has increased, whether or not the average power of a received optical signal $Sb_k$ in any channel has decreased is determined (step S4). At step S4, the determination as to whether or not the average of the received optical signal $Sb_k$ in any channel has decreased is achieved through detection of the power decrease detection signal Sg by the set temperature calculator 116.

Next, when it is determined at step S4 that the average power of the received optical signal $Sb_k$ in any channel has decreased, the channel in which the average power of the received optical signal $Sb_k$ has decreased is specified (step S5). The specification of the channel in which the received optical signal $Sb_k$ has decreased is achieved through detection of the individual channel power decrease detection signal $Si_k$ by the set temperature calculator 116.

Next, it is determined that a failure has occurred in an encoder or a decoder of the channel specified at step S5, since the encoder or decoder of the specified channel corresponds to the failed encoder or decoder described above in (ii), and the decoder is determined to be subjected to temperature control (i.e., determined to be a temperature control target) (step S6). The processes of steps S4 to S6 are achieved through calculation of the logical product of the power decrease detection signal Sg and the individual channel power decrease detection signal $Si_k$ by the AND gate $604_k$. When the channel to be subjected to temperature control has been specified, an OR gate $607_k$ corresponding to the channel to be subjected to temperature control transmits a second trigger signal to a corresponding decoder temperature calculator $608_k$. The second trigger signal acts as a trigger causing the decoder temperature calculator $608_k$ to start a process for calculating a set temperature of the decoder to be subjected to temperature control.

Next, when it is not determined at step S1 that the average power of the received optical signal $Sb_k$ in any channel has increased and it is not determined at step S4 that the average power of the received optical signal $Sb_k$ in any channel has decreased, this corresponds to the case of (iii) described above and therefore it is not possible to determine whether the communication system continues to operate normally or a failure has occurred in the decoder. In this case, whether the communication system is normal or a failure has occurred in the decoder is determined by performing the following process and, when it is determined that a failure has occurred in the decoder, this decoder is determined to be subjected to temperature control. That is, in the case where it is not determined at step S1 that the average power of the received optical signal $Sb_k$ in any channel has increased and it is not determined at step S4 that the average power of the received optical signal $Sb_k$ in any channel has decreased, a determination is made as to whether or not any channel in which the error rate of received information is higher than a predetermined value is present (step S7). This determination is achieved by detection of an error detection signal $Sj_k$ transmitted from the error monitoring part 113 by the set temperature calculator 116. The comparator $501_k$ in the error monitoring part 113 outputs an error detection signal $Sj_k$ indicating the result of comparison of the bit error rate of the received information indicated by the error information signal $Se_k$ provided from the receiver $106_k$ with the threshold TH. The error monitoring part 113 outputs an error detection signal $Sj_k$ having a logic value of "1" indicating that the bit error rate is abnormally high when the bit error rate is higher than the threshold TH.

Next, in the case where it is determined at step S7 that no channel in which the error rate of received information is higher than the predetermined value is present, it is determined that encoders and decoders of all channels are normal and temperature control of encoders and decoders is not performed (step S8).

On the other hand, in the case where it is determined at step S7 that a channel in which the error rate of received information is higher than the predetermined value is present, the channel in which the error rate is higher than the predetermined value is specified (step S9). This specification is achieved by detection of an error detection signal $Sj_k$ transmitted from the error monitoring part 113 by the set temperature calculator 116.

Next, it is determined that a failure has occurred in the decoder of the channel specified at step S9 and the decoder of the channel specified is determined to be subjected to temperature control (step S10). The processes of steps S7 to S9 are achieved by calculation of the logical product of the error detection signal $Sj_k$, the logical negation of the power decrease detection signal Sg, and the logical negation of the power increase detection signal Sf by the AND gate $606_k$. When the channel to be subjected to temperature control has been specified, an OR gate $607_k$ corresponding to the channel to be subjected to temperature control transmits a second trigger signal to a corresponding decoder temperature calculator $608_k$. The second trigger signal acts as a trigger causing the decoder temperature calculator $608_k$ to start a process for calculating a set temperature of the decoder to be subjected to temperature control.

2. Method for Controlling Temperature of Encoder

Figure 13A:
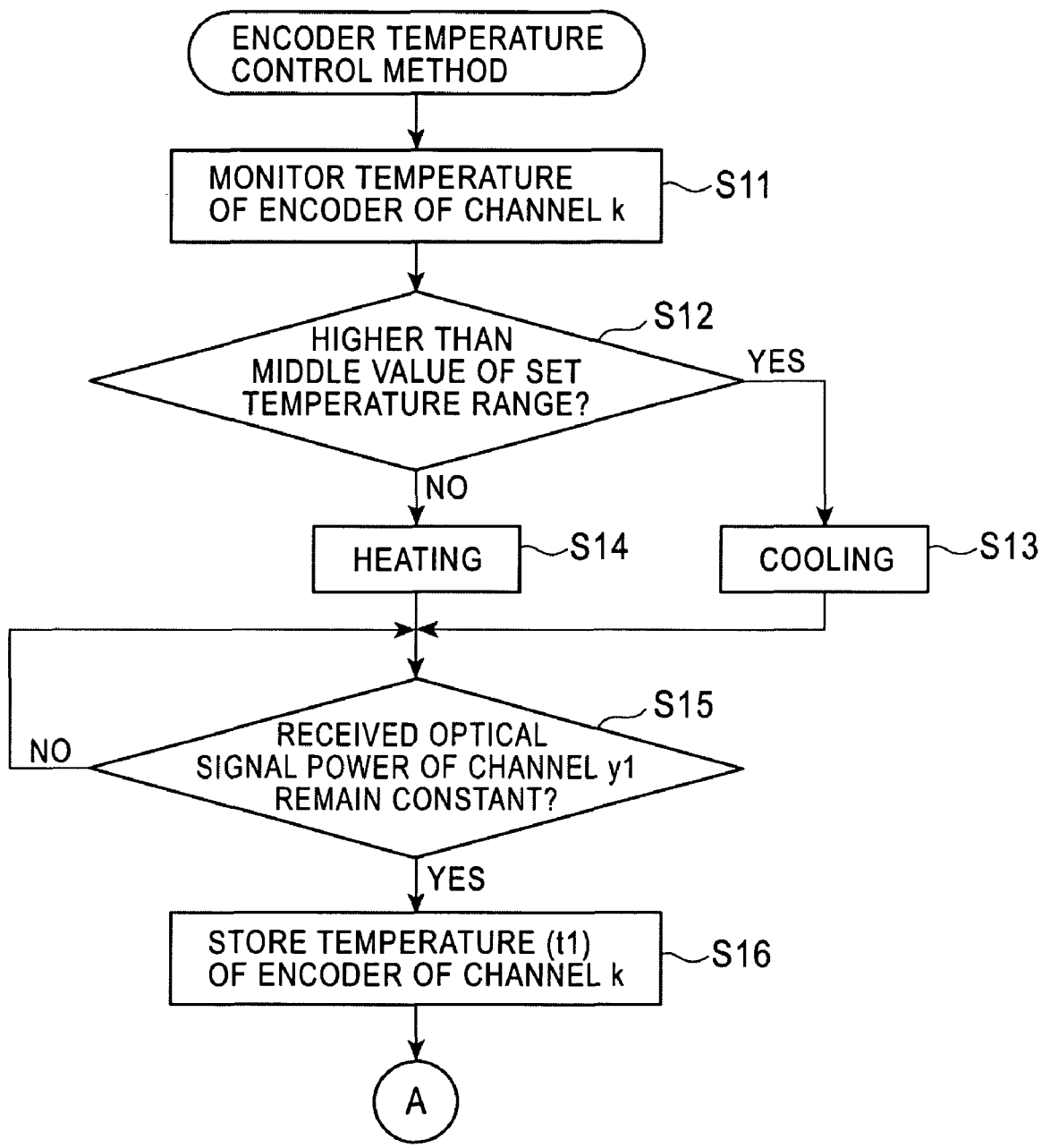
FIGS. 13A and 13B are flow charts illustrating a method for controlling the temperature of an encoder that is performed in the OCDM communication system according to the present invention.
Figure 13B:
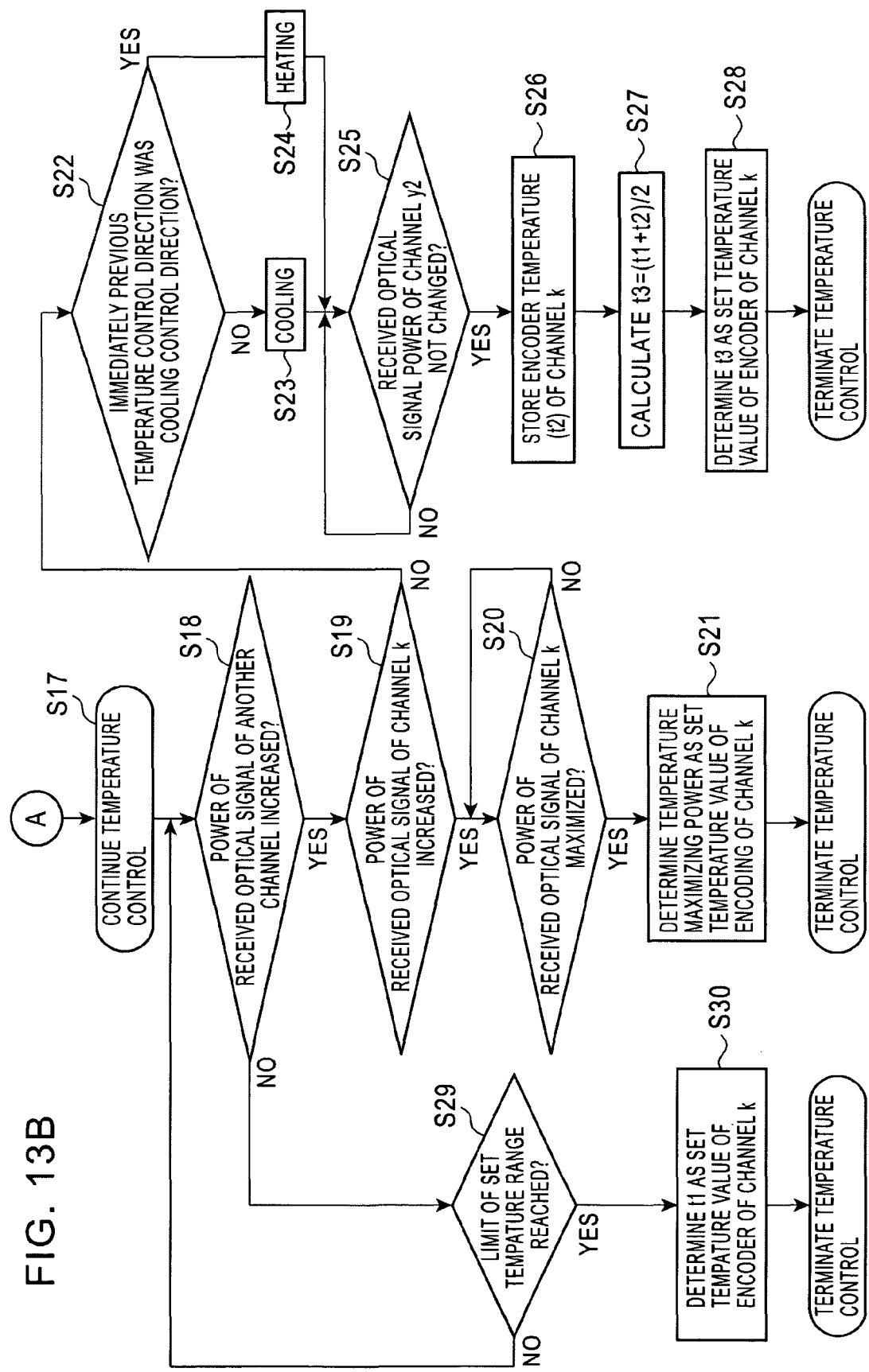

A method for controlling the temperature of an encoder in the Optical Code Division Multiplexing (OCDM) communication system according to the present invention is described below in conjunction with the operation of the encoder temperature calculator $602_k$. FIGS. 13A and 13B are flow charts illustrating a method for controlling the temperature of an encoder that is performed in the Optical Code Division Multiplexing (OCDM) communication system according to the present invention. In the case where it is possible to specify failure of an encoder, it is possible to overcome the failure by changing the temperature of the encoder to correct a changed code value to be equal to a code value of a corresponding decoder (i.e., a decoder of the same channel).

In, this system, the case where temperature control is performed on an encoder corresponds to the case of (i) described above. That is, in this case, encoders of a plurality of channels have the same code value and signals encoded using the same code value are multiplexed and transmitted. In FIGS. 13A and 13B, it is assumed that a channel, whose encoder has failed, is "channel k", a channel whose code value is equal to a changed code value of the channel k is "channel y1", and a channel other than channels k and y is "channel y2".

Figure 12:
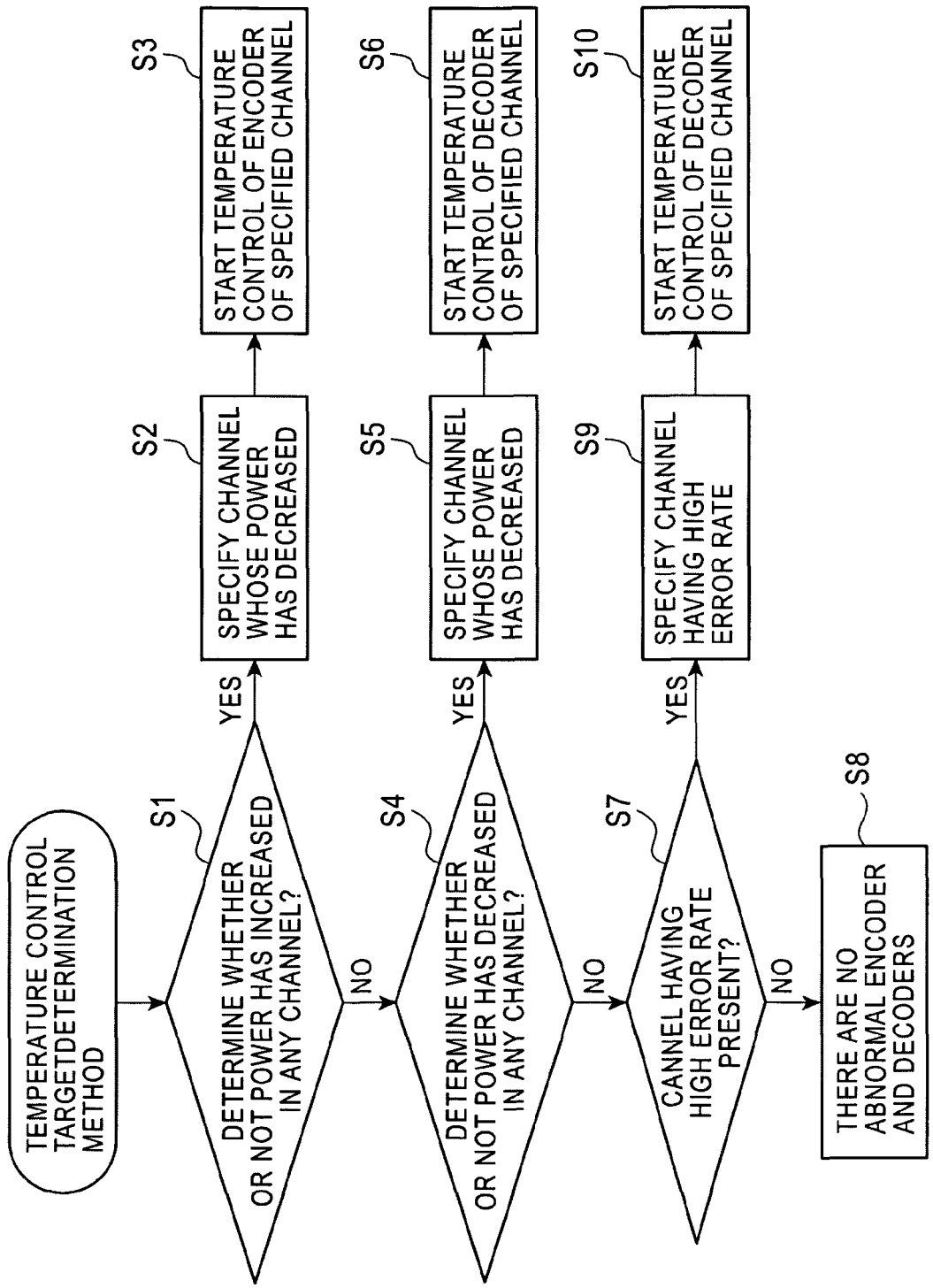
FIG. 12 is a flow chart illustrating a method for determining an encoder and a decoder that are subjected to temperature control in an OCDM communication system according to the present invention.

The encoder in which a failure has occurred is specified by performing the procedure shown in the flow chart of FIG. 12. Control of the temperature of the encoder in which a failure has occurred starts when the logic value of the first trigger signal transmitted by the AND gate $601_k$ in the set temperature calculator 116 rises to "1". The first trigger signal is provided to the SR flip-flop 708 of the encoder temperature calculator $602_k$. Since the first trigger signal may drop to "0" during a period from when the failure of the encoder is detected to when the temperature control is completed, the logic value is kept at "1" using the SR flip-flop 708 during the period until temperature control is completed.

When temperature control starts according to the first trigger signal, the encoder temperature calculator $602_k$ monitors the temperature of the encoder $301_k$ of the channel k in which a failure has occurred (step S11). That is, the temperature information signal $Soc_k$ of the channel k provided from the OCDM line part 103 is stored in the memory 711.

The encoder temperature calculator $602_k$ determines the direction of change of temperature when performing the temperature control of the encoder $301_k$, i.e., determines whether to heat or cool the encoder $301_k$. Namely, the encoder temperature calculator $602_k$ determines whether or not the monitored temperature value of the encoder $301_k$ is higher than the middle value of the range of temperatures that can be set as the set temperature of the encoder $301_k$ (step S12). When it is determined at step S12 that the monitored temperature value of the encoder $301_k$ is higher than the middle value of the set temperature range of the encoder $301_k$, the encoder temperature calculator $602_k$ outputs a temperature setting signal $Stc_k$ causing a temperature change in the direction for cooling the encoder $301_k$ (step S13). On the other hand, when it is determined at step S12 that the monitored temperature value of the encoder $301_k$ is less than the middle value of the set temperature range of the encoder $301_k$, the encoder temperature calculator $602_k$ outputs a temperature setting signal $Stc_k$ causing a temperature change in the direction for heating the encoder $301_k$ (step S14).

Here, the adder 712 and the divider 713 are means for outputting the middle value of the range of temperatures that can be set as the set temperature of the encoder $301_k$. The comparator 714 is a means for comparing the monitored temperature value of the encoder $301_k$ provided from the memory 711 with the middle value of the set temperature range provided from the divider 713. The output of the comparator 714 is separated into two signals and one of the two signals is input to the S port of the T flip-flop 720 and the other is input to the R port of the T flip-flop 720 through the NOT gate 715. Thus, one of the S and R ports has a logic value of "1" and the other has a logic value of "0". Here, the logic value input to the CLK port of the T flip-flop 720 does not change. As a result, a logic value input to the switch 722 is initialized. The switch 722 is a means for selecting the direction of change of temperature when temperature control is performed. The switch 722 determines whether to perform heating or cooling by selecting and outputting either the input amount of temperature change $\Delta T$ or $-\Delta$ based on the output signal of the T flip-flop 720. The adder 723 adds the amount of temperature change $\Delta T$ or $-\Delta T$ provided from the switch 722 to the monitored temperature value of the encoder $301_k$ provided from the memory 711 and outputs the added value. The encoder temperature calculator $602_k$ outputs the output signal of the adder 723 as a temperature setting signal $Stc_k$ and provides the temperature setting signal $Stc_k$ to the temperature controller 120. The temperature controller 120 generates a temperature control signal $Svc_k$ to allow the temperature of the encoder $301k'$ to have a value indicated by the temperature setting signal $Stc_k$ and provides the temperature control signal $Svc_k$ to the temperature changing element $302_k$ associated with the encoder $301_k$ in the OCDM line part 103. The temperature changing element $302_k$ changes the temperature of the temperature changing element $302_k$ according to the temperature control signal $Svc_k$ to change the temperature of the encoder $301_k$ via heat transfer through contact with the encoder $301_k$.

The average powers of received optical signals of all channels are monitored while the temperature control of the encoder $301_k$ is being performed. That is, the encoder temperature calculator $602_k$ monitors changes in the power of the received optical signal of each channel by acquiring the individual channel power increase detection signals $Sh_1$ to $Sh_M$ and the individual channel power decrease detection signals $Si_1$ to $Si_M$ (excluding $Si_k$). The encoder temperature calculator $602_k$ stores a temperature (t1) of the encoder $301_k$ of the channel k at an initial time when the power of a received optical signal of the channel y1 has neither increased nor decreased after the temperature control of the encoder $301_k$ starts (steps S15 and S16). After storing the temperature t1, the encoder temperature calculator $602_k$ continues changing the temperature of the encoder $301_k$ in the direction of heating or in the direction of cooling (step S17). Here, the initial time when the power of a received optical signal of the channel y1 has neither increased nor decreased is the time at which the logic value output from the NOT gate 736 changes from "0" to "1". As the output logic value of the NOT gate 736 changes from "0" to "1", the value stored in the counter 728 changes from "0" to "1" and thereby the output logic value of the comparator 729 changes from "0" to "1". This change of the output logic value of the comparator 729 acts as a trigger causing the SR flip-flops 701 and 702 to be reset so that information of received optical signal power changes that have been made until that time is not included in information of power changes after that time. The change of the output logic value of the comparator 729 acts as a trigger causing the SR flip-flop 716 to be reset. Accordingly, the input logic values to the S and R ports of the T flip-flop 720 rise to "1" so that the T flip-flop 720 performs a toggling operation thereafter. The change of the output logic value of the comparator 729 acts as a trigger causing the memory 732 to read the temperature information (t1) of the encoder $301_k$.

In the case where the average of the received optical signal of the channel k has increased while the temperature of the encoder $301_k$ is continuously changing (steps S18 and S19), the encoder temperature calculator $602_k$ determines that a temperature at which the average power is maximized is a set temperature value of the encoder $301_k$ and terminates temperature control of the encoder $301_k$ (steps S20 and S21). This allows the code value of the encoder $301_k$ of the channel k in which a failure has occurred to be equal to the code value of the corresponding decoder $307_k$ of the channel k, thereby enabling communication over the channel k. Here, at the time when the average power of the received optical signal of the channel k is maximized, the value of the individual channel power increase detection signal $Sh_k$ changes from "1" to "0". This change acts as a trigger causing the output of the adder 723 to be stored in the memory 725 through the switch 724 and the memory 725 continuously outputs the read value as a temperature setting signal $Stc_k$. In this manner, temperature control is performed on the encoder $301_k$ so that the encoder $301_k$ maintains the original appropriate code value and the channel k is maintained in the state in which communication is possible.

When the average of the received optical signal of the channel y2 has increased while the temperature of the encoder $301_k$ is continuously changing ("no" at step S19), the encoder temperature calculator $602_k$ reverses the direction of temperature change that has been made until that time (steps S22, S23, and S24). This reversal of the direction of temperature change is performed using the toggling operation of the T flip-flop 720. The OR gate 705 outputs a logic value of "1" when the average power of a received optical signal of a channel other than the channel k has increased. This changes the logic value of the CLK port of the T flip-flop 720 from "0" to "1". This change acts as a trigger to reverse the logic value output from the T flip-flop 720, thereby reversing the sign of the value indicating the amount of temperature change output from the switch 722.

The encoder temperature calculator $602_k$ stores a temperature (t2) of the encoder $301_k$ of the channel k at an initial time when the power of the received optical signal of the channel y2 has neither increased nor decreased after the direction of temperature change is reversed (steps S25 and S26). The encoder temperature calculator $602_k$ calculates a mean temperature (t3) between the temperature (t1) of the encoder $301_k$ stored at step S16 and the temperature (t2) of the encoder $301_k$ stored at step S26 (step S27), determines that the temperature (t3) is the set temperature value of the encoder $301_k$, and terminates temperature control of the encoder $301_k$ (steps S27 and S28). In this case, the encoder $301_k$, which has been controlled to reach the temperature (t3), has an unused code value that has not been allocated to any channel and that is different from the code value of the corresponding decoder $307_k$. Accordingly, in this case, using a method described below, temperature control of the decoder $307_k$ is performed to allow the code values of the encoder $301_k$ and the decoder $307_k$ to be equal. Here, the logic value output from the NOT gate 736 changes from "0" to "1" at an initial time when the power of the received optical signal of the channel y2 has neither increased nor decreased. This change acts as a trigger causing the value stored in the counter 728 to change from "1" to "2". This causes the logic value output from the comparator 730 to change from "0" to "1". This change of the output of the comparator 730 acts as a trigger causing the memory 732 to read the temperature information (t2) of the encoder $301_k$ and outputs the stored temperature information (t2) after a delay time given by the delayer 733 has elapsed. At the same time, the memory 732 outputs the temperature information (t1) stored at step S16. The adder 734 and the divider 735 calculate the mean temperature of the temperature information t1 and t2 (i.e., t3=(t1+t2)/2). The change of the output of the comparator 730 acts as a trigger causing the value (t3) output from the divider 735 to be stored in the memory 725 through the switch 724 and the memory 725 continuously outputs the value (t3) as a temperature setting signal $Stc_k$. At the same time, the logic value output from the OR gate 741 changes from "0" to "1" and this change acts as a trigger to reset the operation of the encoder temperature calculator $602_k$.

When the average powers of the received optical signals of the channel k and the channel y2 have not changed until the temperature of the encoder $301_k$ reaches the upper or lower limit in the case where the temperature of the encoder $301_k$ is continuously changing at step S17 ("no" at step S18), the encoder temperature calculator $602_k$ determines that the value (t1) stored at step S16 is a set temperature value of the encoder $301_k$ and terminates temperature control (steps S29 and S30). In this case, the encoder $301_k$, which has been controlled to reach the temperature (t1), has an unused code value that has not been allocated to any channel and that is different from the code value of the corresponding decoder $307_k$. Accordingly, in this case, using a method described below, temperature control of the decoder $307_k$ is performed to allow the code values of the encoder $301_k$ and the decoder $307_k$ to be equal. Here, the comparators 737 and 738 are means for determining whether or not the temperature of the encoder $301_k$ is out of the settable temperature range. When the temperature of the encoder $301_k$ is out of the settable temperature range, the logic value output from the OR gate 739 changes from "0" to "1". This change acts as a trigger causing the temperature information (t1) stored in the memory 731 to be stored in the memory 725 through the switch 724 and the memory 725 continuously outputs the value (t1) as a temperature setting signal $Stc_k$.

3. Method for Controlling Temperature of Decoder

Figure 14:
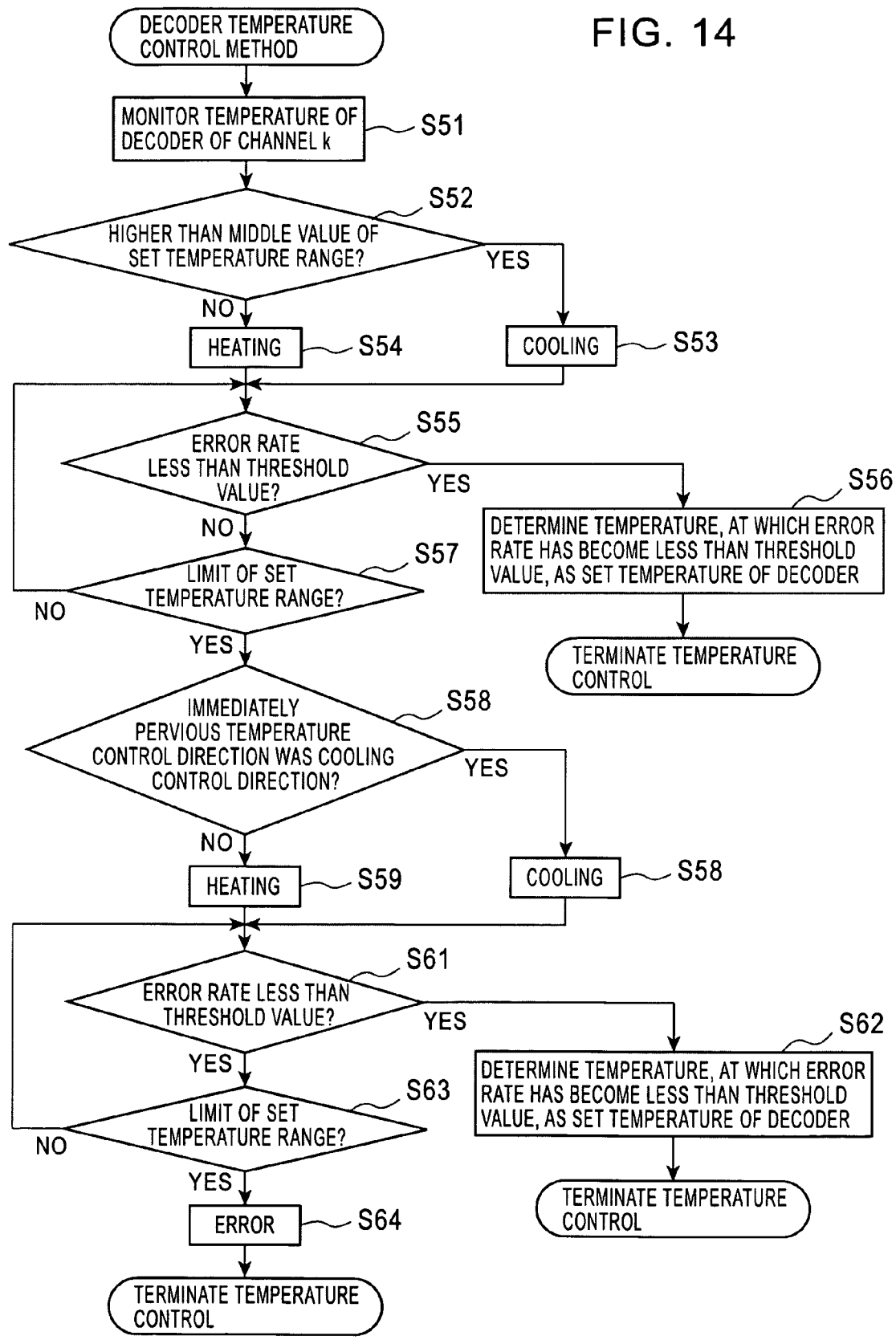
FIG. 14 is a flow chart illustrating a method for controlling the temperature of a decoder that is performed in the OCDM communication system according to the present invention.

A method for controlling the temperature of a decoder in the Optical Code Division Multiplexing (OCDM) communication system according to the present invention is described below in conjunction with the operation of the decoder temperature calculator $608_k$. FIG. 14 is a flow chart illustrating a method for controlling the temperature of a decoder that is performed in the Optical Code Division Multiplexing (OCDM) communication system according to the present invention.

There is a need to control the temperature of a decoder in the case where a channel whose encoder and decoder have different code values is present while encoders of all multiplexed channels have different code values. In this case, when an error rate of received information in the channel is monitored, the error rate is higher than a threshold value. Here, the threshold value is the maximum error rate among error rates at which it can be considered that normal communication is possible. (Even when it is assumed that code values of an encoder and a decoder are equal, the threshold value cannot be set to "0" since a bit error may occur due to influence of noise or the like). In the following description, it is assumed that a failure has occurred in a decoder of a channel k.

The decoder in which a failure has occurred is specified by performing the procedure shown in the flow chart of FIG. 12. Control of the temperature of the decoder in which a failure has occurred is initiated as the logic value of the second trigger signal transmitted by the OR gate $607_k$ in the set temperature calculator 116 rises to "1". The second trigger signal is also generated in the channel k in the case where the need to control the temperature of the decoder occurs when the temperature control of the encoder has been completed (i.e., when the temperature control of the encoder of steps S27 and S29 has been completed).

The second trigger signal is provided to the SR flip-flop 803 of the decoder temperature calculator $608_k$. Since the second trigger signal may drop to "0" during a period from when the failure of the decoder $307_k$ is detected to when the temperature control is completed, the logic value is kept at "1" using the SR flip-flop 803 during the period until temperature control is completed.

When temperature control starts based on the second trigger signal, the decoder temperature calculator $608_k$ monitors the temperature of the decoder $307_k$ of the channel k in which a failure has occurred (step S51). That is, the temperature information signal $Sod_k$ of the channel k provided from the OCDM line part 103 is stored in the memory 806.

The decoder temperature calculator $608_k$ determines the direction of change of temperature when performing the temperature control of the decoder $307_k$, i.e., determines whether to heat or cool the decoder $307_k$. Namely, the decoder temperature calculator $608_k$ determines whether or not the monitored temperature value of the decoder $307_k$ is higher than the middle value of the range of temperatures that can be set as the set temperature of the decoder $307_k$ (step S52). When it is determined at step S52 that the monitored temperature value of the decoder $307_k$ is higher than the middle value of the set temperature range of the decoder $307_k$, the decoder temperature calculator $608_k$ outputs a temperature setting signal $Std_k$ causing a temperature change in the direction for cooling the decoder $307_k$ (step S53). On the other hand, when it is determined at step S52 that the monitored temperature value of the decoder $307_k$ is less than the middle value of the set temperature range of the decoder $307_k$, the decoder temperature calculator $608_k$ outputs a temperature setting signal $Std_k$ causing a temperature change in the direction for heating the decoder $307_k$ (step S54).

Here, the adder 807 and the divider 808 are means for outputting the middle value of the range of temperatures that can be set as the set temperature of the decoder $307_k$. The comparator 809 is a means for comparing the monitored temperature value of the decoder $307_k$ provided from the memory 806 with the middle value of the set temperature range provided from the divider 808. The output of the comparator 809 is separated into two signals and one of the two signals is input to the S port of the T flip-flop 815 and the other is input to the R port of the T flip-flop 815 through the NOT gate 812. Thus, one of the S and R ports has a logic value of "1" and the other has a logic value of "0". Here, the logic value input to the CLK port of the T flip-flop 815 does not change. As a result, a logic value input to the switch 817 is initialized. The switch 817 is a means for selecting the direction of change of temperature when temperature control is performed. The switch 817 determines whether to perform heating or cooling by selecting and outputting either the input amount of temperature change ΔT or −ΔT based on the output signal of the T flip-flop 815. The adder 818 adds the amount of temperature change ΔT or −ΔT provided from the switch 817 to the monitored temperature value of the decoder $307_k$ provided from the memory 806 and outputs the added value. The decoder temperature calculator $608_k$ outputs the output signal of the adder 818 as a temperature setting signal $Std_k$ and provides the temperature setting signal $Std_k$ to the temperature controller 120. The temperature controller 120 generates a temperature control signal $Svd_k$ to allow the temperature of the decoder $307k'$ to have a value indicated by the temperature setting signal $Std_k$ and provides the temperature control signal $Svd_k$ to the temperature changing element $302_k$ associated with the decoder $307_k$ in the OCDM line part 103. The temperature changing element $302_k$ changes the temperature of the temperature changing element $302_k$ according to the temperature control signal $Svd_k$ to change the temperature of the decoder $307_k$ via heat transfer through contact with the decoder $307_k$.

An error rate of received information in the channel k is monitored while the temperature control of the decoder $307_k$ is being performed. That is, the decoder temperature calculator $608_k$ monitors the error rate of the received information in the channel k by acquiring the error detection signal $Sj_k$ provided from the error monitoring part 113.

The decoder temperature calculator $608_k$ stops temperature change when the error rate of the received information of the channel k has become less than the threshold TH after temperature control of the decoder $307_k$ is initiated. That is, the decoder temperature calculator $608_k$ determines that the temperature at that time is a set temperature value of the decoder $307_k$ and terminates temperature control (steps S55 and S56). This allows communication of the channel k to be possible since the temperature of the decoder $307_k$ is controlled to allow the error rate to have a normal value. When the error rate of the received information of the channel k has become less than the threshold TH, the output logic value of the NOT gate 802 drops to "0", causing the switch 823 to stop transmitting the output signal. Accordingly, the memory 824 maintains the value stored when the error rate of the received information of the channel k became less than the threshold TH. The decoder temperature calculator $608_k$ outputs the value stored in the memory 824 as a temperature setting signal $Std_k$ and provides the temperature setting signal $Std_k$ to the temperature controller 120.

When the error rate of the received information of the channel k has become less than the threshold TH before the limit of the set temperature range of the decoder $307_k$ is reached, the decoder temperature calculator $608_k$ reverses the direction of temperature change that has been made until that time (steps S57, S58, S59, and S60). After reversing the direction of temperature change of the decoder $307_k$, the decoder temperature calculator $608_k$ stops temperature change when the error rate of the received information of the channel k has become less than the threshold TH. That is, the decoder temperature calculator $608_k$ determines that the temperature at that time is a set temperature value of the decoder $307_k$ and terminates temperature control (steps S61 and S62). This allows communication over the channel k to be possible since the temperature of the decoder $307_k$ is controlled to allow the error rate to have a normal value.

Here, the comparators 819 and 820 are means for determining whether or not the temperature of the decoder $307_k$ is out of the set temperature range. When the temperature of the decoder $307_k$ is out of the settable temperature range, the logic value output from the OR gate 821 changes from "0" to "1". The reversal of the direction of temperature change is performed using the toggling operation of the T flip-flop 815. When the logic value output from the OR gate 821 rises to "1", the SR flip-flop 811 is reset and both the input logic values to the S and R ports of the T flip-flop 815 rise to "1" so that the T flip-flop 815 performs a toggling operation thereafter. When the logic value output from the OR gate 821 rises to "1", the logic value input to the CLK port of the T flip-flop 815 changes from "0" to "1". This change acts as a trigger to reverse the logic value output from the T flip-flop 815, thereby reversing the sign of the value indicating the amount of temperature change output from the switch 817. Here, since a delay time is added to the logic value signal output from the OR gate 821 as the logic value signal passes through the delayer 822, the changed logic value is input to the CLK port of the T flip-flop 815 after the T flip-flop 815 performs a toggling operation.

The decoder temperature calculator $608_k$ terminates temperature control of the decoder $307_k$ when the error rate of the received information of the channel k has not become less than the threshold TH until the limit of the set temperature range of the decoder $307_k$ is reached after the direction of temperature change of the decoder $307_k$ is reversed. In this case, it is not possible to restore communication of the channel k through temperature control of the encoder $301_k$ and the decoder $307_k$. In this case, information indicating that it is not possible to restore communication of the channel k may be displayed on a display unit that is provided on the OCDM line part 103 or the like.

As is apparent from the above description, in the Optical Code Division Multiplexing (OCDM) communication system and the method for correcting failure of the OCDM communication system according to the present invention, it is possible to specify a channel in which a failure has occurred and also to specify whether a failure has occurred in an encoder or a decoder of the channel through monitoring of average powers of received optical signals. In addition, code values of an encoder and a decoder of a channel in which a failure has occurred are corrected so that the code values of the encoder and the decoder are equal by performing temperature control of the encoder while monitoring average powers of received optical signals of all channels at the encoder and by performing temperature control of the decoder while monitoring an error rate of received information of the channel at the decoder. Therefore, it is possible to restore communication of the channel without affecting communication of other channels.

In addition, according to the OCDM communication system according to the present invention, a code value of an encoder can be fixedly set to a code value of an unused channel. Therefore, in the case where new channels are added to an existing OCDM line, there is no need to perform processes such as band reallocation and band division for all added channels.

This application is based on Japanese Patent Application No. 2009-226742 which is herein incorporated by reference.

What is claimed is:

1. An Optical Code Division Multiplexing (OCDM) communication system comprising:
a plurality of encoders provided respectively for a plurality of communication channels, each of the encoders including a superstructured fiber Bragg grating, in which a plurality of unit fiber Bragg gratings is arranged, and encoding an optical signal using a code value determined according to a distance between adjacent ones of the unit fiber Bragg gratings;
a plurality of decoders provided respectively for the plurality of communication channels, each of the decoders including a superstructured fiber Bragg grating, in which a plurality of unit fiber Bragg gratings is arranged, and generating a received optical signal by decoding an optical signal encoded by a corresponding encoder using a code value determined according to a distance between adjacent ones of the unit fiber Bragg gratings;

a temperature changing part that individually changes a temperature of each of the encoders and the decoders based on a control signal;

a transmission path provided for multiplexed transmission of optical signals between the encoders and the decoders;

a power monitoring part that generates a first detection signal indicating whether or not an average power of each received optical signal has changed in each unit time;

an error monitoring part that generates a second detection signal according to an error rate of each received optical signal; and a set temperature calculating part that calculates a set temperature of the encoder or decoder based on the first and second detection signals and provides the calculated set temperature as the control signal to the temperature changing part, wherein the set temperature calculating part calculates the set temperature of the encoder or the decoder so that respective code values of an encoder and a decoder belonging to a communication channel in which an average power of a received optical signal has changed or a communication channel in which an error rate of a received optical signal is higher than a predetermined value are equal.

2. The OCDM communication system according to claim 1, wherein, when it is detected based on the first detection signal that an average power of a received optical signal in one of the communication channels has increased and that an average power of a received optical signal in one of the communication channels has decreased, the set temperature calculating part generates a control signal to change a temperature of an encoder belonging to the communication channel in which it is detected that the average power of the received optical signal has decreased.

3. The OCDM communication system according to claim 2, wherein the set temperature calculating part calculates the set temperature of the encoder so that the average power of the received optical signal is maximized in the communication channel in which it is detected that the average power of the received optical signal has decreased.

4. The OCDM communication system according to claim 2, wherein the set temperature calculating part calculates the set temperature of the encoder so that a code value of the encoder belonging to the communication channel, in which it is detected that the average power of the received optical signal has decreased, is not equal to a code value of an encoder and a decoder belonging to another communication channel.

5. The OCDM communication system according to claim 2, wherein, when it is detected based on the first detection signal that an average power of a received optical signal has not increased in any of the communication channels and that an average power of a received optical signal has decreased in one of the communication channels, the set temperature calculating part generates a control signal to change a temperature of a decoder belonging to the communication channel in which it is detected that the average power of the received optical signal has decreased.

6. The OCDM communication system according to claim 5, wherein the set temperature calculating part calculates the set temperature of the decoder so that an error rate of the received optical signal is less than a predetermined value.

7. The OCDM communication system according to claim 1, wherein, when it is detected based on the second detection signal that an error rate of a received optical signal in one of the communication channels is higher than a predetermined value, the set temperature calculating part generates a control signal to change a temperature of a decoder belonging to the communication channel in which the error rate of the received optical signal is higher than the predetermined value.

8. The OCDM communication system according to claim 7, wherein the set temperature calculating part calculates the set temperature of the decoder so that an error rate of the received optical signal is less than a predetermined value.

9. The OCDM communication system according to claim 1, further comprising a temperature detection part that generates a third detection signal indicating a temperature of each of the encoders and the decoders, wherein the set temperature calculating part outputs, as the control signal, a value obtained by adding a predetermined amount of temperature change to the temperature of the encoder or the decoder indicated by the third detection signal.

10. The OCDM communication system according to claim 1, further comprising a temperature changing element that heats or cools each of the encoders and the decoders via heat transfer through contact with each of the encoders and the decoders.

11. A method for correcting failure of an Optical Code Division Multiplexing (OCDM) communication system including a plurality of encoders provided respectively for a plurality of communication channels, each of the encoders including a superstructured fiber Bragg grating, in which a plurality of unit fiber Bragg gratings is arranged, and encoding an optical signal using a code value determined according to a distance between adjacent ones of the unit fiber Bragg gratings, a plurality of decoders provided respectively for the plurality of communication channels, each of the decoders including a superstructured fiber Bragg grating, in which a plurality of unit fiber Bragg gratings is arranged, and generating a received optical signal by decoding an optical signal encoded by a corresponding encoder using a code value determined according to a distance between adjacent ones of the unit fiber Bragg gratings, and a transmission path provided for multiplexed transmission of optical signals between the encoders and the decoders, the method comprising:

a first detection process including detecting whether or not an average power of each received optical signal has changed in each unit time;

a second detection process including detecting whether or not an error rate of each received optical signal is higher than a predetermined value; and a temperature control process including controlling the temperature of the encoder or the decoder so that respective code values of an encoder and a decoder belonging to a communication channel in which an average power of a received optical signal has changed or a communication channel in which an error rate of a received optical signal is higher than a predetermined value are equal.

12. The method according to claim 11, wherein, when it is detected in the first detection process that an average power of a received optical signal in one of the communication channels has increased and that an average power of a received optical signal in one of the communication channels has decreased, an encoder belonging to the communication channel in which it is detected that the average power of the received optical signal has decreased is determined to be subjected to temperature control in the temperature control process.

13. The method according to claim 12, wherein, in the temperature control process, temperature control is performed on the encoder determined to be subjected to temperature control so that the average power of the received optical signal is maximized in the communication channel in which it is detected that the average power of the received optical signal has decreased.

14. The method according to claim 12, wherein, in the temperature control process, temperature control is performed on the encoder determined to be subjected to temperature control so that a code value of the encoder belonging to the communication channel, in which it is detected that the average power of the received optical signal has decreased, is not equal to a code value of an encoder and a decoder belonging to another communication channel.

15. The method according to claim 11, wherein, when it is detected in the first detection process that an average power of a received optical signal has not increased in any of the communication channels and that an average power of a received optical signal has decreased in one of the communication channels, a decoder belonging to the communication channel in which it is detected that the average power of the received optical signal has decreased is determined to be subjected to temperature control in the temperature control process.

16. The method according to claim 15, wherein, in the temperature control process, temperature control is performed on the encoder determined to be subjected to temperature control so that an error rate of the received optical signal is less than a predetermined value.

17. The method according to claim 11, wherein, when it is detected in the second detection process that an error rate of a received optical signal in one of the communication channels is higher than a predetermined value, a decoder belonging to the communication channel in which the error rate of the received optical signal is higher than the predetermined value is determined to be subjected to temperature control in the temperature control process.

18. The method according to claim 17, wherein, in the temperature control process, temperature control is performed on the encoder determined to be subjected to temperature control so that an error rate of the received optical signal is less than a predetermined value.

19. The method according to claim 11, wherein temperature control of each of the encoders and the decoders is performed by changing a temperature of a temperature changing element that is in contact with each of the encoders and the decoders.

* * * * *